United States Patent
Matsutani

(10) Patent No.: US 9,648,242 B2
(45) Date of Patent: May 9, 2017

(54) DISPLAY CONTROL APPARATUS, DISPLAY CONTROL METHOD, PROGRAM, AND IMAGE PICKUP APPARATUS FOR ASSISTING A USER

(71) Applicant: Sony Corporation, Minato-ku (JP)

(72) Inventor: Atsushi Matsutani, Tokyo (JP)

(73) Assignee: SONY CORPORATION, Tokyo (JP)

( * ) Notice: Subject to any disclaimer, the term of this patent is extended or adjusted under 35 U.S.C. 154(b) by 93 days.

(21) Appl. No.: 14/278,147

(22) Filed: May 15, 2014

(65) Prior Publication Data
US 2014/0368698 A1    Dec. 18, 2014

(30) Foreign Application Priority Data

Jun. 12, 2013   (JP) ................................. 2013-123845

(51) Int. Cl.
H04N 5/232   (2006.01)

(52) U.S. Cl.
CPC ..... *H04N 5/23293* (2013.01); *H04N 5/23219* (2013.01); *H04N 5/23258* (2013.01); *H04N 5/23287* (2013.01); *H04N 5/23296* (2013.01)

(58) Field of Classification Search
CPC .......... H04N 5/23293; H04N 5/23287; H04N 5/23258; H04N 5/23219; H04N 5/23296
See application file for complete search history.

(56) References Cited

U.S. PATENT DOCUMENTS

| | | | | |
|---|---|---|---|---|
| 2002/0101517 A1* | 8/2002 | Leppisaari | ......... | H04N 5/23293 348/231.6 |
| 2010/0171863 A1* | 7/2010 | Kim | ................... | H04N 5/23216 348/333.11 |
| 2010/0277620 A1* | 11/2010 | Iijima | ................ | H04N 5/23232 348/240.1 |
| 2011/0221918 A1* | 9/2011 | Kasahara | ............... | G03B 17/20 348/222.1 |
| 2011/0267503 A1* | 11/2011 | Kunishige | .............. | H04N 5/232 348/240.1 |

FOREIGN PATENT DOCUMENTS

JP    2008-22708    2/2008

OTHER PUBLICATIONS

U.S. Appl. No. 14/266,974, filed May 1, 2014, Matsutani, et al.

* cited by examiner

*Primary Examiner* — Albert Cutler
(74) *Attorney, Agent, or Firm* — Oblon, McClelland, Maier & Neustadt, L.L.P.

(57) ABSTRACT

There is provided a display control apparatus, including: a composition determining section configured to determine recommended composition of an input image; an image generating section configured to generate an image based on the recommended composition; and a display controller configured to control displaying the input image, the recommended composition, and the image based on the recommended composition, on a display section.

20 Claims, 24 Drawing Sheets

DISPLAY CONTROL APPARATUS, DISPLAY CONTROL METHOD, PROGRAM, AND IMAGE PICKUP APPARATUS FOR ASSISTING A USER

CROSS REFERENCE TO RELATED APPLICATIONS

This application claims the benefit of Japanese Priority Patent Application JP 2013-123845 filed Jun. 12, 2013, the entire contents of which are incorporated herein by reference.

BACKGROUND

The present disclosure relates to a display control apparatus, a display control method, a program, and an image pickup apparatus.

For example, Japanese patent application laid-open No. 2008-22708 discloses an image pickup apparatus configured to display appropriate composition on a display section, and to assist a user to take a picture having the appropriate composition.

SUMMARY

However, for example, if a user is a beginner of an image pickup apparatus, it is difficult for him to take a picture having the composition, which is instructed by the image pickup apparatus.

In view of the above-mentioned circumstances, it is desirable to provide a display control apparatus, a display control method, a program, and an image pickup apparatus.

In view of the above-mentioned circumstances, according to an embodiment of the present technology, there is provided, for example, a display control apparatus, including:

a composition determining section configured to determine recommended composition of an input image;

an image generating section configured to generate an image based on the recommended composition; and a display controller configured to control displaying the input image, the recommended composition, and the image based on the recommended composition, on a display section.

According to an embodiment of the present technology, there is provided, for example, a display control method, including:

determining, by a composition determining section, recommended composition of an input image;

generating, by an image generating section, an image based on the recommended composition; and controlling, by a display controller, displaying the input image, the recommended composition, and the image based on the recommended composition, on a display section.

According to an embodiment of the present technology, there is provided, for example, a program, causing a computer to execute the steps of:

determining, by a composition determining section, recommended composition of an input image;

generating, by an image generating section, an image based on the recommended composition; and controlling, by a display controller, displaying the input image, the recommended composition, and the image based on the recommended composition, on a display section.

According to an embodiment of the present technology, there is provided, for example, an image pickup apparatus, including:

an image pickup section;

a composition determining section configured to determine recommended composition of an input image, the input image being obtained by the image pickup section;

an image generating section configured to generate an image based on the recommended composition; and a display controller configured to control displaying the input image, the recommended composition, and the image based on the recommended composition, on a display section.

According to at least one of the embodiments, it is possible to display a recommended-composition-based image. Note that the effects described in the present specification are merely examples. The effects are not limited to the effects described in the present specification. Further, the present technology may have effects other than the exemplified effects.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 1 is a diagram showing an example of the outer appearance of an image pickup apparatus of the first embodiment and the like;

FIG. 2 is a diagram showing an example of the outer appearance of the image pickup apparatus of the first embodiment and the like;

FIG. 3 is a block diagram showing an example of the configuration of the image pickup apparatus of the first embodiment and the like;

DETAILED DESCRIPTION OF EMBODIMENTS

Hereinafter embodiments of the present disclosure will be described with reference to the drawings. Note that the embodiments will be described in the following order.
<1. First embodiment>
<2. Second embodiment>
<3. Third embodiment>
<4. Examples of modification>

The following embodiments and the like are preferable specific examples of the present technology. The present technology will not be limited to those embodiments and the like.

1. First Embodiment

Example of Outer Appearance of Image Pickup Apparatus

Figure 1:
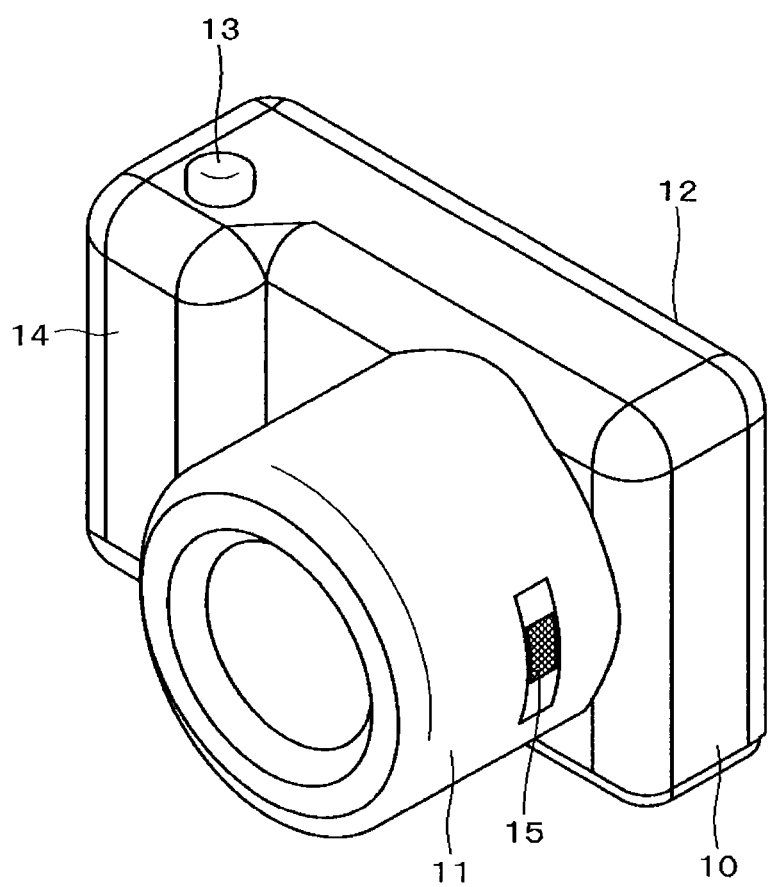

FIG. 1 is a perspective view showing an example of an outer appearance of an image pickup apparatus. A display control apparatus is applied to the image pickup apparatus. For example, the image pickup apparatus 1 has a function of picking up moving images and still images. For example, the image pickup apparatus 1 includes the camera body 10, the lens tube 11, the monitor 12, the shutter button (also referred to as release button, etc.) 13, the grip 14, and the electric zoom key 15. The lens tube 11 accommodates lenses including a zoom lens and the like.

For example, the camera body 10 includes a front surface, a back surface, a top surface, a bottom surface, a right side surface, and a left side surface. Note that the wording of directions (front, back, left, right, etc.) is determined for convenience in the description. The scope of the present technology is not limited to those directions. The lens tube 11 is on the front surface of the camera body 10. The monitor 12 is on the back surface side of the camera body 10. The end portion of the front surface of the camera body 10 protrudes slightly. The grip 14 includes the protrusion portion and the right side surface of the camera body 10. The shutter button 13 is on the top surface of the camera body 10, and is in the vicinity of the grip 14. The electric zoom key 15 is on the circumferential surface of the lens tube 11. For example, the electric zoom key 15 is slidable in the up-and-down direction. The electric zoom key 15 may be on the camera body 10.

The lens tube 11 functions as a lens window. Light (optical image) from an object enters the lens window. Further, the lens tube 11 also functions as an image-pickup optical system. The image-pickup optical system guides the light from the object to an image pickup device in the camera body 10. The lens tube 11 may be removed from the camera body 10 when a lens change button or the like is pressed.

The lens tube 11 includes a lens group. The lens group accommodates a plurality of lenses. The plurality of lenses are arrayed along the optical axis in order. For example, the lens group includes a focus lens and a zoom lens. The focus lens adjusts the focus. The zoom lens changes scaling factor. The zoom lens moves arbitrarily in the optical axis direction depending on an operation, which is input in the electric zoom key 15. As a result, optical zoom is performed. For example, digital zoom is performed in a case where enlargement of optical zoom reaches the limit. The zooming will be described in detail later.

Note that a rotatable ring may be provided on the circumferential surface of the lens tube 11. Further, a user manually operates the ring. The zoom lens may move in the optical axis direction depending on the rotational direction and the rotational angle of the ring. A zoom factor is set depending on the position of the zoom lens after it moves. A ring for adjusting the focus may be provided on the lens tube 11. A user rotates the ring, whereby the focus lens moves. A user may adjust the focus manually in this manner.

The monitor 12 includes an LCD (Liquid Crystal Display) panel, an organic EL (Electroluminescence) panel, or the like. For example, a menu window and reproduced images are displayed on the monitor 12. The menu window is used when a user wishes to set a function of the image pickup apparatus 1. Further, when a user decides composition of an object (framing) before picking up an image, an image (through-the-lens image) is displayed on the monitor 12 (live view display). The through-the-lens image has a moving image mode.

For example, the shutter button 13 may be "pressed halfway down" and "pressed all the way down". The state where the shutter button 13 is "pressed halfway down" means that the shutter button 13 is pressed partway down. The state where the shutter button 13 is "pressed all the way down" means that the shutter button 13 is further pressed down. When the shutter button 13 is pressed halfway down, for example, preparation operation for picking up a still image of an object is performed. Examples of the preparation operation for picking up a still image of an object include setting of an exposure control value, detection operation for detecting a focus, emission of a fill light section, and the like. Note that in a case where the shutter button 13 is pressed halfway down and then is released, preparation operation is completed.

In a case where the shutter button 13 is pressed halfway down and then is further pressed, the shutter button 13 is pressed all the way down. In this case, an imaging instruction is ordered. The image pickup device is used, and an exposure operation of an object image (optical image of object) is performed. Predetermined image signal processing is performed on image data, which is obtained in the exposure operation. As a result, a still image is obtained. Image data, which corresponds to the obtained still image, is stored in storage arbitrarily. Examples of the storage include a memory card, a hard disk in the image pickup apparatus 1, and the like. Note that in a case where a moving image is picked up, for example, when the shutter button 13 is pressed, a moving image is picked up. When the shutter button 13 is pressed again, pickup of the moving image is stopped.

A user of the image pickup apparatus 1 grips the grip 14. The surface of the grip 14 may have bumps such that a user's hand fits the grip 14 well. For example, a battery storage room and a card storage room are provided inside the grip 14. A battery is accommodated in the battery storage room. The battery is a power source of the image pickup apparatus 1. A secondary battery such as a lithium-ion secondary battery is used as a battery. As a matter of course a primary battery may also be used. A memory card is detachably accommodated in the card storage room. The memory card stores image data of pickup images and the like. A sensor or the like may be provided on the grip 14. The sensor detects if the grip 14 is gripped or not.

The electric zoom key 15 is on the circumferential surface of the lens tube 11, for example. A user may slide the electric zoom key 15 in the up-and-down direction, for example. One of the up direction and the down direction is set as the telephoto (T) side. The other direction is set as the wide-angle (W) side. For example, a user slides the electric zoom key 15 to the telephoto side to thereby instruct the image pickup apparatus 1 to increase the zoom factor. The user slides the electric zoom key 15 to the wide-angle side to thereby instruct the image pickup apparatus 1 to reduce the zoom factor.

Figure 2:
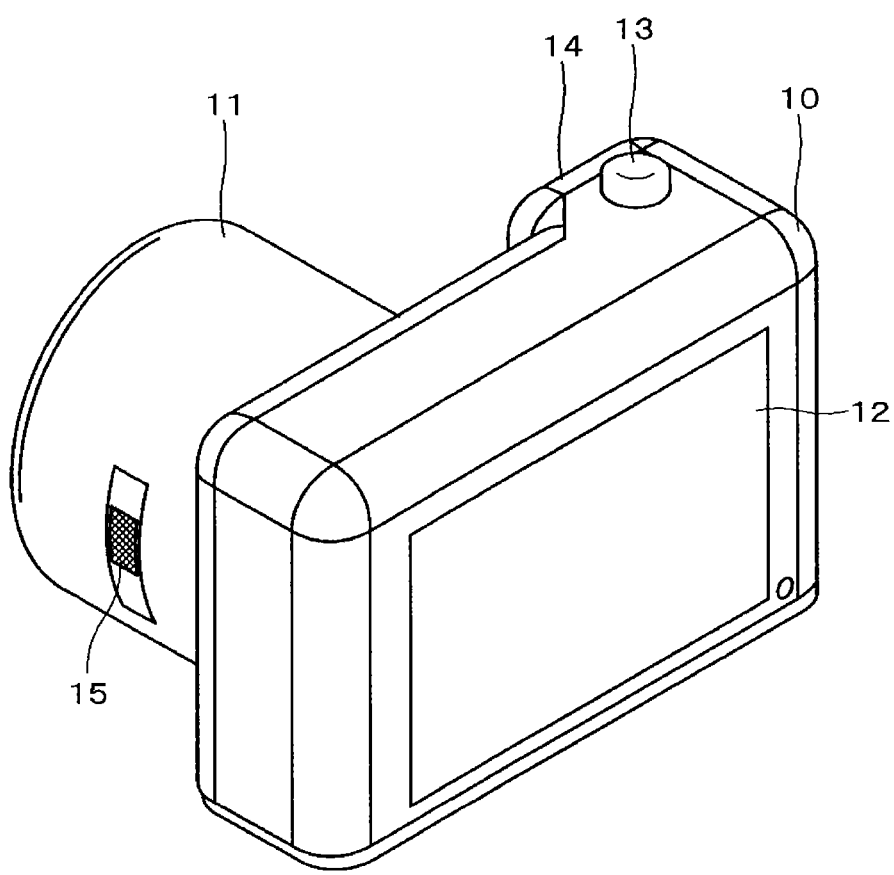

FIG. 2 is a perspective view of the image pickup apparatus 1, which is seen from the back surface side. As described above, the monitor 12 is on the back surface side of the camera body 10. Note that, for example, the monitor 12 may be provided on the camera body 10 by using a hinge. Further, thanks to the hinge, a user may rotate the monitor 12 freely and may change the orientation of the monitor 12. As a result, for example, the image pickup apparatus 1 may pick up an image of its user. In other words, the image pickup apparatus 1 may take a so-called selfie.

[Example of Electrical Configuration of Image Pickup Apparatus]

Figure 3:
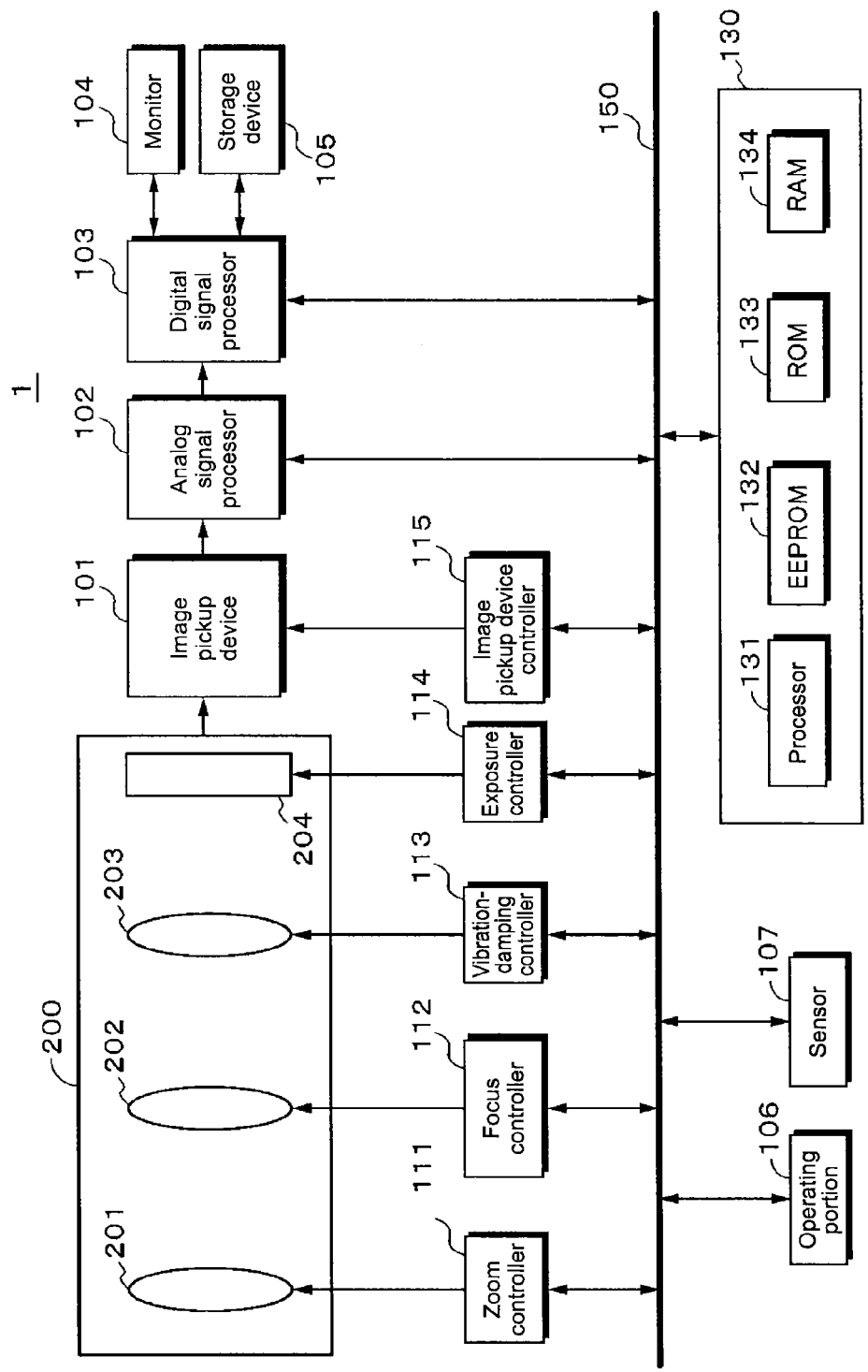

FIG. 3 is a block diagram showing an example of the electrical configuration of the image pickup apparatus 1. For example, the image pickup apparatus 1 includes the image pickup device 101, the analog signal processor 102, the digital signal processor 103, the monitor 104, the storage device 105, the operating portion 106, the sensor 107, the controller 130, and the lens block 200. Note that the monitor 104 corresponds to the monitor 12 of FIG. 1 and FIG. 2.

For example, the controller 130 includes the processor 131, the EEPROM (Electrically Erasable Programmable Read-Only Memory) 132, the ROM (Read Only Memory) 133, and the RAM (Random Access Memory) 134.

The lens block 200 includes the zoom lens 201, the focus lens 202, the vibration-damping lens 203, and the diaphragm (including shutter) 204 for adjusting exposure. Note that FIG. 3 shows that the zoom lens 201 or the like includes one lens. Alternatively, the zoom lens 201 may include a plurality of lenses (lens group). Alternatively, the zoom lens 201 may include a plurality of lens groups. How to array the lenses may be changed arbitrarily.

The image pickup apparatus 1 includes a controller mechanism. The controller mechanism controls the respective parts of the lens block 200 and the respective parts of the image pickup device 101. Specifically, for example, the image pickup apparatus 1 includes the zoom controller 111, the focus controller 112, the vibration-damping controller 113, the exposure controller 114, and the image pickup device controller 115. The zoom controller 111 is configured to control the zoom lens 201. The focus controller 112 is configured to control the focus lens 202. The vibration-damping controller 113 is configured to control the vibration-damping lens 203. The exposure controller 114 is configured to control the diaphragm 204. The image pickup device controller 115 is configured to control the image pickup device 101.

The bus 150 connects the respective blocks of the image pickup apparatus 1. The respective blocks send/receive data and commands via the bus 150. Hereinafter the respective blocks of the image pickup apparatus 1 will be described.

The lens block 200 is configured to form an image of an object on an imaging area of the image pickup device 101. The respective lenses of the lens block 200 are arrayed approximately in series along the optical axis of light (sometimes referred to as object light) from an object. Here, in the case where the lenses are "arrayed approximately in series", light, which passes through the lens block 200, is capable of entering the image pickup device 101. The centers of the respective lenses and the center of the image pickup device 101 are not necessarily arrayed in line. Note that the lens block 200 may include a mirror device, which is configured to reflect a part of the object light in a predetermined direction.

The zoom lens 201 is moved in the optical axis direction. As a result, the focal length is changed, and the zoom of an object is adjusted. The zoom lens 201 is controlled by the zoom controller 111 and is thus displaced. For example, the zoom controller 111 includes a drive mechanism and a microcomputer. The drive mechanism is a step motor or the like, which is configured to drive the zoom lens 201.

The microcomputer is capable of communicating with the processor 131 of the controller 130 via the bus 150. For example, the processor 131 communicates with the microcomputer of the zoom controller 111, and supplies a zoom-lens-control signal to the microcomputer. In response to the zoom-lens-control signal, the drive mechanism of the zoom controller 111 operates. The drive mechanism moves the zoom lens 201 to the position corresponding to the zoom-lens-control signal. Further, the zoom controller 111 communicates with the processor 131, and supplies position information to the processor 131. The position information includes the position of the zoom lens 201.

The focus lens 202 is moved in the optical axis direction. As a result, the focus on an object may be adjusted. For example, the focus controller 112 includes a drive mechanism and a microcomputer. The drive mechanism is a step motor or the like, which is configured to drive the focus lens 202.

The microcomputer is capable of communicating with the processor 131 of the controller 130 via the bus 150. For example, the processor 131 communicates with the microcomputer of the focus controller 112, and supplies a focus-lens-control signal to the microcomputer. In response to the focus-lens-control signal, the drive mechanism of the focus controller 112 operates. The drive mechanism moves the focus lens 202 to the position corresponding to the focus-lens-control signal. Further, the focus controller 112 communicates with the processor 131, and supplies position information to the processor 131. The position information includes the position of the focus lens 202.

The vibration-damping lens 203 is configured to correct fluctuations. For example, the sensor 107 supplies sensor information to the processor 131. The sensor 107 includes a gyro sensor and the like. The processor 131 generates correcting information for correcting fluctuations based on the sensor information. The processor 131 supplies the correcting information to the vibration-damping controller 113. The vibration-damping controller 113 controls the vibration-damping lens 203 whereby the vibration-damping lens 203 is displaced. As a result, fluctuations are corrected optically. Note that fluctuations may not be corrected optically. Alternatively, fluctuations may be corrected based on signal processing of image data. Alternatively, both the methods may be used.

The diaphragm 204 adjusts the amount of object light, which will enter the image pickup device 101. For example, the processor 131 controls the exposure controller 114 whereby the exposure controller 114 operates. The exposure controller 114 opens/closes the diaphragm, the shutter, and the like of the diaphragm 204 appropriately. The exposure controller 114 controls the diaphragm so as to obtain the optimum value of the diaphragm. The exposure controller 114 controls the shutter so as to obtain the optimum value of the shutter speed. Further, the exposure controller 114 controls the diaphragm 204 so as to obtain various optimum values.

For example, the image pickup device 101 is a sensor including two-dimensionally arrayed image pickup devices. For example, the image pickup device 101 is a CMOS (Complementary Metal Oxide Semiconductor) image sensor. The CMOS image sensor exposes each pixel to light at different timing. Alternatively, the image pickup device 101 may be a CCD (Charge Coupled Device) image sensor or another image sensor. For example, an image pickup section includes the image pickup device 101 and the lens block 200. Alternatively, the image pickup section may include the image pickup device 101, and the analog signal processor 102 and the digital signal processor in the latter stage.

For example, the image pickup device 101 picks up images of an object in sync with the period of a vertical synchronizing signal. An optical image of an object enters the image pickup device 101 via the lens block 200 and a primary color filter (not shown). The primary color filter is provided in front of the image pickup device 101. The image pickup device 101 photoelectrically converts the optical image to thereby generate an image pickup signal. The image pickup device 101 outputs the generated image pickup signal to the analog signal processor 102. Controlled by the image pickup device controller 115, the image pickup device 101 generates an image pickup signal and performs other processing. For example, the image pickup device 101 generates an image pickup signal at the timing of when the image pickup device controller 115 supplies a signal to the image pickup device 101.

For example, controlled by the processor 131, the image pickup device controller 115 operates. The image pickup device controller 115 controls the image pickup device 101. The image pickup device controller 115 controls the image pickup device 101 such that the image pickup device 101 photoelectrically converts the optical image of an object, which enters the image pickup device 101 via the lens block 200 and the primary color filter, and generates an image pickup signal. Further, the image pickup device controller 115 controls the image pickup device 101 such that the image pickup device 101 drives an electric shutter. Alternatively, controlled by the processor 131, the image pickup device controller 115 may move the image pickup device 101 to the appropriate position to thereby correct fluctuations.

The image pickup device 101 supplies analog image data to the analog signal processor 102. The analog signal processor 102 performs CDS (Correlated Double Sampling) processing of the analog image data to thereby obtain a favorable S/N (Signal to Noise) ratio. Further, the analog signal processor 102 performs AGC (Automatic Gain Control) processing to thereby control the gain. In addition, the analog signal processor 102 performs known analog signal processing. The analog signal processor 102 supplies analog image data, to which the analog signal processor 102 performs the analog signal processing, to the digital signal processor 103.

The digital signal processor 103 is a DSP (Digital Signal Processor), for example. The digital signal processor 103 performs predetermined digital image processing. Examples of the digital image processing include Y/C separation processing, white balance processing, interpolation processing, gamma correction processing, color correction processing, contour correction processing, tone reproduction processing, noise reduction processing, and the like. Further, the digital signal processor 103 has a conversion function. The digital signal processor 103 converts image data having an analog format to image data having a digital format arbitrarily. Alternatively, the digital signal processor 103 converts image data having a digital format to image data having an analog format arbitrarily. Note that the digital signal processor 103 supplies the digital image data, which is processed by the digital signal processor 103, to the controller 130 via the bus 150 as needed.

For example, the digital signal processor 103 supplies image data, which is processed by the digital signal processor 103, to the monitor 104. The image data is displayed on the monitor 104. The monitor 104 includes a display panel and a driver. Examples of the display panel include an LCD panel, an organic EL panel, and the like. The driver is configured to drive the display panel. Not only the image data but also a menu window and the like are displayed on the monitor 104. The menu window is used when a user configures various settings for the image pickup apparatus 1.

For example, the digital signal processor 103 supplies the image data, which is processed by the digital signal processor 103, to the storage device 105. The storage device 105 stores the image data. For example, if the image data is moving image data, the digital signal processor 103 compresses the image data, which is processed by the digital signal processor 103, by using a compression coding format such as AVCHD (Advanced Video Codec High Definition) (registered trademark). The storage device 105 stores the compressed image data. If the image pickup apparatus 1 is configured to pick up still images, the digital signal processor 103 compresses still image data by using a compression coding format such as JPEG (Joint Photographic Experts Group). The storage device 105 stores the compressed still image data.

The storage device 105 is at least one of a storage device, which is built in the image pickup apparatus 1, and a storage device, which is detachably attached to the image pickup apparatus 1. Examples of the storage device 105 include a hard disk, a flash memory, an optical disk, a magnetooptical disk, and the like. Controlled by the digital signal processor 103, the storage device 105 stores image data, which is picked up. For example, a user may arbitrarily set a built-in memory or an external memory, in which image data is stored.

The operating portion 106 includes input mechanisms of the image pickup apparatus 1 such as buttons, dials, and switches. A user operates the operating portion 106. In response, various settings for the image pickup apparatus 1 are configured and images are picked up. Note that, in this example, the above-mentioned monitor 104 is a touchscreen (touch panel). In this case, the monitor 104 functions as the operating portion 106. A user's voice may instruct the image pickup apparatus 1 to operate. The operating portion 106 includes the above-mentioned electric zoom key 15. Note that an input device for performing zoom operation may not be a physical key, but may be a zoom key displayed on the monitor 104.

In response to an operation to the operating portion 106, the operating portion 106 generates an operation signal. The operating portion 106 supplies the generated operation signal to the processor 131 via the bus 150. In response to the supplied operation signal, the processor 131 controls the image pickup apparatus 1.

For example, the sensor 107 is a gyro sensor. The sensor 107 obtains sensor information. The sensor 107 supplies the obtained sensor information to the processor 131 of the controller 130. The processor 131 is configured to determine how the image pickup apparatus 1 moves by using the sensor information.

The controller 130 controls the respective blocks of the image pickup apparatus 1. The controller 130 includes the processor 131 such as a CPU (Central Processing Unit), the EEPROM 132, the ROM 133, and the RAM 134. The processor 131 is configured to generate control commands to control the respective blocks of the image pickup apparatus 1. The processor 131 is configured to perform various kinds of arithmetic processing.

Examples of the functions of the processor 131 will be described. The processor 131 functions as a composition determining section. The composition determining section is configured to determine appropriate composition (arbitrarily referred to as recommended composition) of an input image. The digital signal processor 103 performs digital signal processing on digital image data. The digital signal processor 103 supplies the processed digital image data to the controller 130 via the bus 150. The RAM 134 temporarily stores the supplied processed digital image data. The processor 131 detects an important element from the image data stored in the RAM 134. The processor 131 determines recommended composition including the detected important element. For example, the important element includes a person's face. As a matter of course, an important element is not necessarily a person's face. For example, the important element may be an object in the center of an image.

Note that the way to set the recommended composition may be changed arbitrarily. In this example, recommended composition is determined based on the so-called rule of thirds. According to the rule of thirds, the monitor 104 is divided into three equal parts in the vertical and three equal parts in the horizontal (the monitor 104 is divided into nine equal parts in total). The above-mentioned important element is placed on or in the vicinity of one of the intersections of the dividing lines. As a matter of course, recommended composition may be set based on another method (for example, rule of fourths). A user may set his favorite composition method out of a plurality of composition methods.

A recommended-composition frame (sometimes simply referred to as recommended composition) is superimposed on image data, which is stored in the RAM 134. The recommended-composition frame shows recommended composition, which is determined by the processor 131. Then, the processor 131 retrieves the image data, on which the recommended composition is superimposed, from the RAM 134. The processor 131 supplies the image data, on which the recommended composition is superimposed, to the digital signal processor 103. The digital signal processor 103 supplies the image data, on which the recommended composition is superimposed, to the monitor 104. A through-the-lens image, on which recommended composition is superimposed, is displayed on the monitor 104. Note that a user may set if recommended composition is displayed on the monitor 104 or not.

Further, the processor 131 functions as an image generating section. The image generating section is configured to generate a recommended-composition-based image. For example, the image in recommended composition is deformed while the center of the recommended composition is in the center of the image. As a result, the recommended-composition-based image is obtained. For example, the deformation includes at least one of zooming in, zooming out, and rotation. The processor 131 supplies the generated recommended-composition-based image to the monitor 104 at an arbitrarily timing. The recommended-composition-based image, which has the appropriate composition, is displayed on the monitor 104.

As described above, the processor 131 functions as a display controller. The display controller is configured to control the monitor 104 to display an input image such as a through-the-lens image, recommended composition superimposed on the input image, and a recommended-composition-based image. As a matter of course, the above-mentioned functions of the processor 131 are merely examples. The processor 131 may have other functions different from the functions described in the above-mentioned examples.

The EEPROM 132 or the RAM 134 is used as a work memory when the processor 131 operates, a temporary storage area for storing data, and storage for storing various histories. For example, the ROM 133 stores programs executed by the processor 131.

[Zooming Method]

Next, examples of zoom methods performed by the image pickup apparatus 1 will be described. The image pickup apparatus 1 is configured to perform optical zoom. The optical zoom is an example of a first zoom method. According to the optical zoom method, the image pickup apparatus 1 moves the zoom lens 201, thus changes the focal length, and optically enlarges an object. The quality of the optically-zoomed image is not degraded.

The image pickup apparatus 1 is configured to perform digital zoom. According to the digital zoom method, the image pickup apparatus 1 performs predetermined signal processing on an image, and thus enlarges an object. Some digitally-zoomed images are degraded and others are not. For example, according to one method, pixels are interpolated, and an image is thus enlarged. According to this method, the quality of the obtained image is degraded.

To the contrary, according to another method, the number of pixels (image size) of a picked-up image is smaller than the number of pixels of the image pickup device. In this case, for example, a central portion of the image pickup device is clipped. As a result, an image is zoomed in. This method is based on the difference between the angle of view of the maximum area of the image pickup device and the angle of view of the clipped area. The quality of the obtained image is not degraded basically.

A method based on the super-resolution technology is an example of a method of obtaining an image whose quality is not degraded. According to this method, for example, one pixel is analyzed. Alternatively, a plurality of pixels in a small block unit are analyzed. Pixels having optimum patterns are selected based on the analysis result. The original pixels are replaced by the selected pixels. As a result, an enlarged image is obtained. According to this method, the quality of the obtained image is not degraded basically. There are various digital zoom methods other than the methods of the above-mentioned examples. The present technology may employ any digital zoom method of enlarging an image based on some image processing. The present technology is not limited to a specific method.

A user instructs the image pickup apparatus 1 to zoom an image. Then, for example, the image is zoomed based on the optical zoom method at first. Further, the enlargement factor of the optical zoom reaches the limit. Then, the image is zoomed based on the digital zoom method. As a result, the image is zoomed at a higher enlargement factor.

Meanwhile, in general, in a case where an image is zoomed optically and digitally, the image is enlarged while the center of the image or a point in the vicinity of the center (sometimes referred to as approximate center) is the center of the enlarged image. For example, let's say that the monitor 104 of the image pickup apparatus 1 displays a through-the-lens image of FIG. 4. For example, the through-the-lens image includes the person HU as the object and the plurality of flowers FL as the background. The face FA of the person HU is at the approximate center of the through-the-lens image. The frame FR1 is set. The face FA is in the center of the frame FR1. Note that the frame FR1 is used for the purpose of illustration. The frame FR1 may not be displayed actually.

Figure 5:
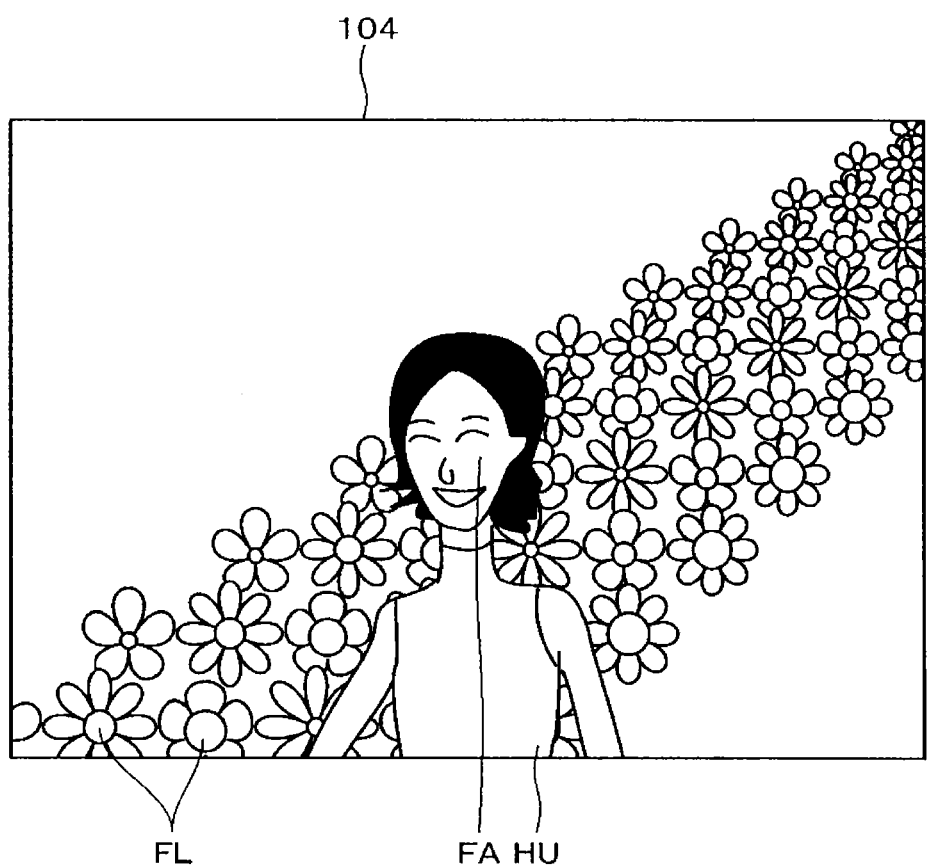
FIG. 5 is a diagram showing an example of the optical zoom.
Figure 6:
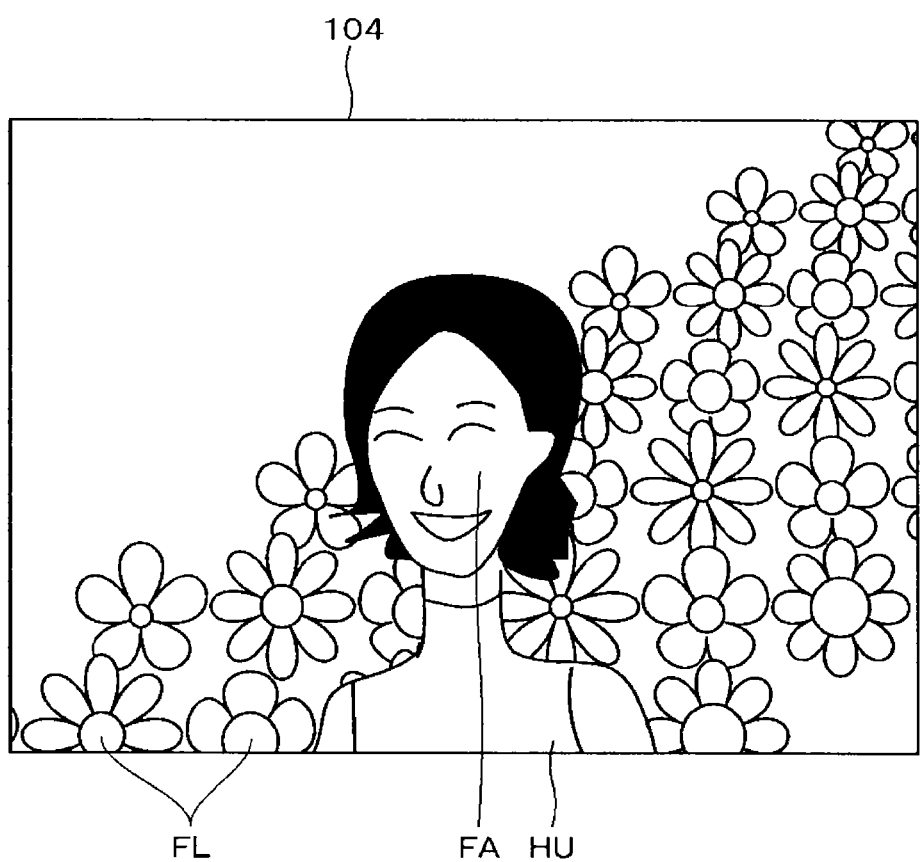
FIG. 6 is a diagram showing an example of the optical zoom.

The through-the-lens image is displayed on the monitor 104. In this state, zoom operation is input in the electric zoom key 15. The through-the-lens image is zoomed optically. Alternatively, the through-the-lens image is zoomed optically and digitally. In response to the zoom operation, the image is enlarged while the approximate center (in the vicinity of the face FA) of the through-the-lens image is the center of enlargement. For example, as shown in FIG. 5 and FIG. 6, the through-the-lens image is enlarged seamlessly. The image is enlarged as if the four corners of the frame FR1 of FIG. 4 travel to the corresponding corners of the monitor 104 by the equal travel distance, respectively.

The commonly-used zoom method is described above. In addition, the present technology enables another digital zoom method (sometimes referred to as composition-priority digital zoom). According to the composition-priority digital zoom, priority is given to recommended composition. The composition-priority digital zoom is an example of a second zoom method. According to the composition-priority digital zoom, for example, the image in recommended composition (sometimes referred to as image-in-composition) is enlarged while the approximate center of the image-in-composition is the center of enlargement.

Figure 4:
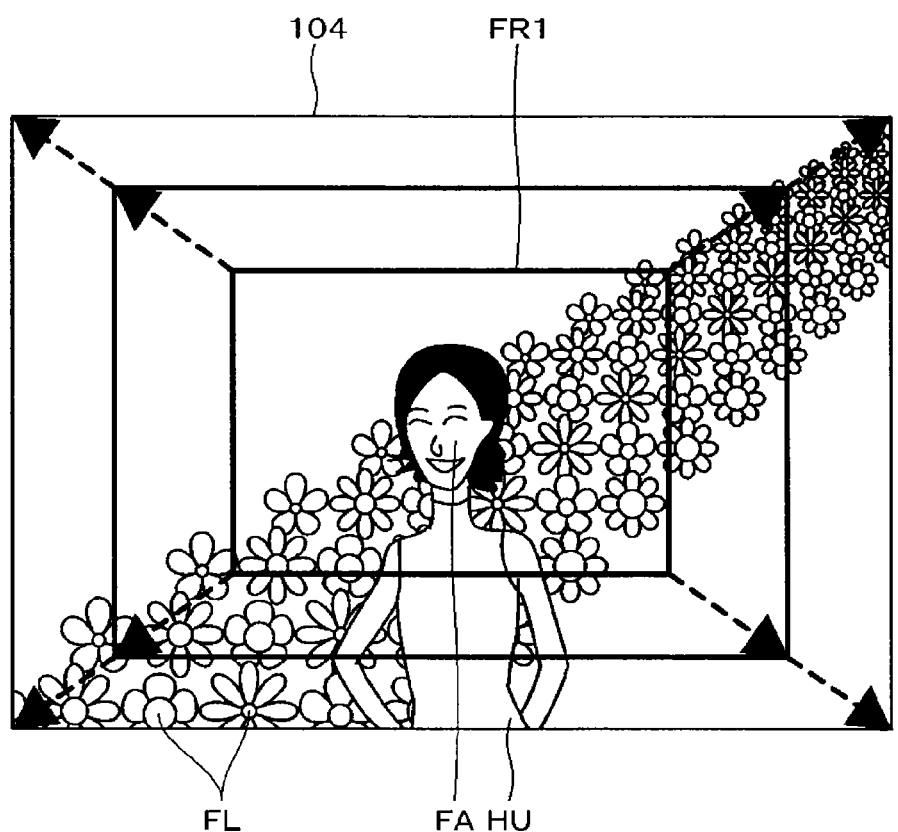
FIG. 4 is a diagram showing an example of optical zoom.
Figure 7:
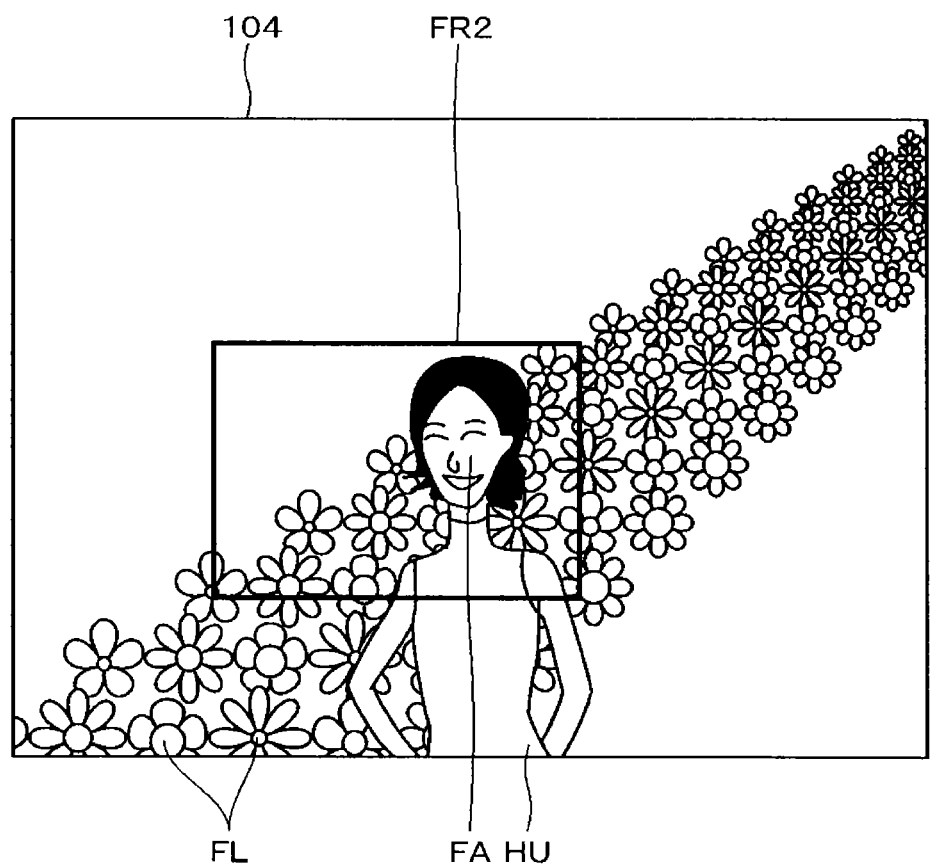
FIG. 7 is a diagram showing an example of composition-priority digital zoom.

FIG. 7 shows the through-the-lens image same as that of FIG. 4. For example, recommended composition is set based on the rule of thirds. The face FA of the person HU in the image is the important element. The recommended composition FR2 is displayed on the monitor 104. The recommended composition FR2 shows the set recommended composition. According to the composition-priority digital zoom, in response to zoom operations input in the electric zoom key 15, an image is enlarged while the approximate center of the image-in-composition is the center of enlargement.

Figure 8:
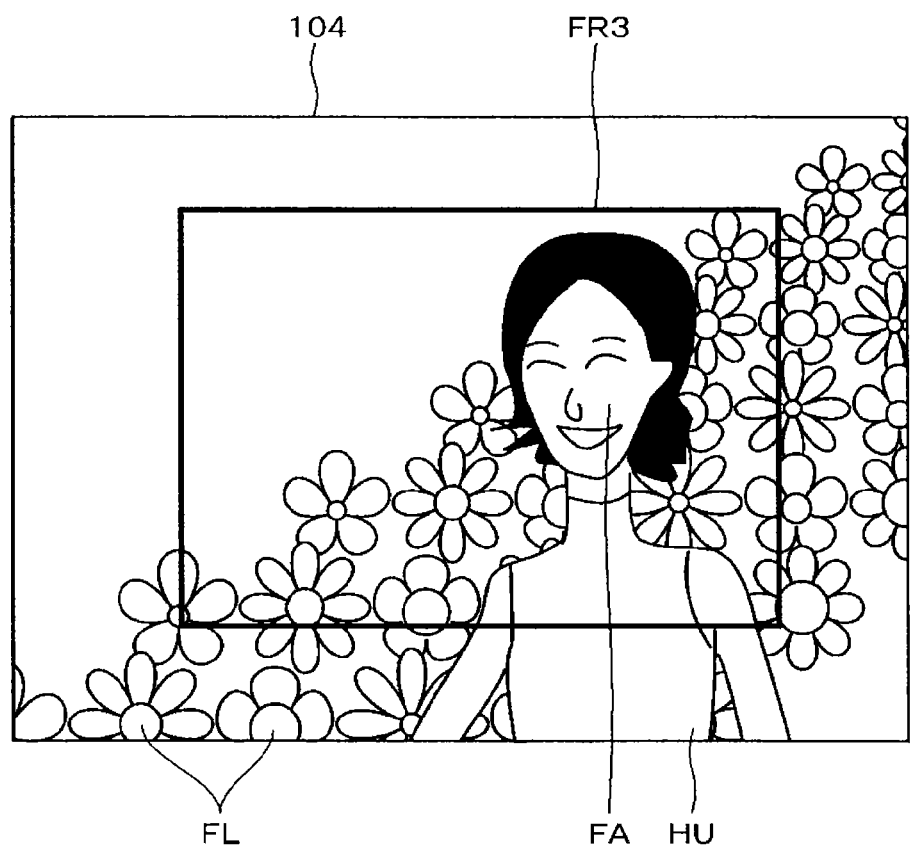
FIG. 8 is a diagram showing an example of the composition-priority digital zoom.

FIG. 8 shows an example of an image, which is enlarged at predetermined scaling factor based on the composition-priority digital zoom. An image is enlarged at predetermined scaling factor. New recommended composition is set to the enlarged image. The recommended composition FR3 is displayed on the monitor 104. The recommended composition FR3 shows the set recommended composition. As described above, the new recommended composition is set. As a result, the image-in-composition is also changed based on the set recommended composition. When the image is enlarged based on the composition-priority digital zoom, the four corners of the recommended composition travel to the corresponding corners of the monitor 104, respectively. In this case, the travel distances of the four corners are not the same. The travel distances of the four corners are different from each other depending on the position of the recommended composition and the like.

Figure 9:
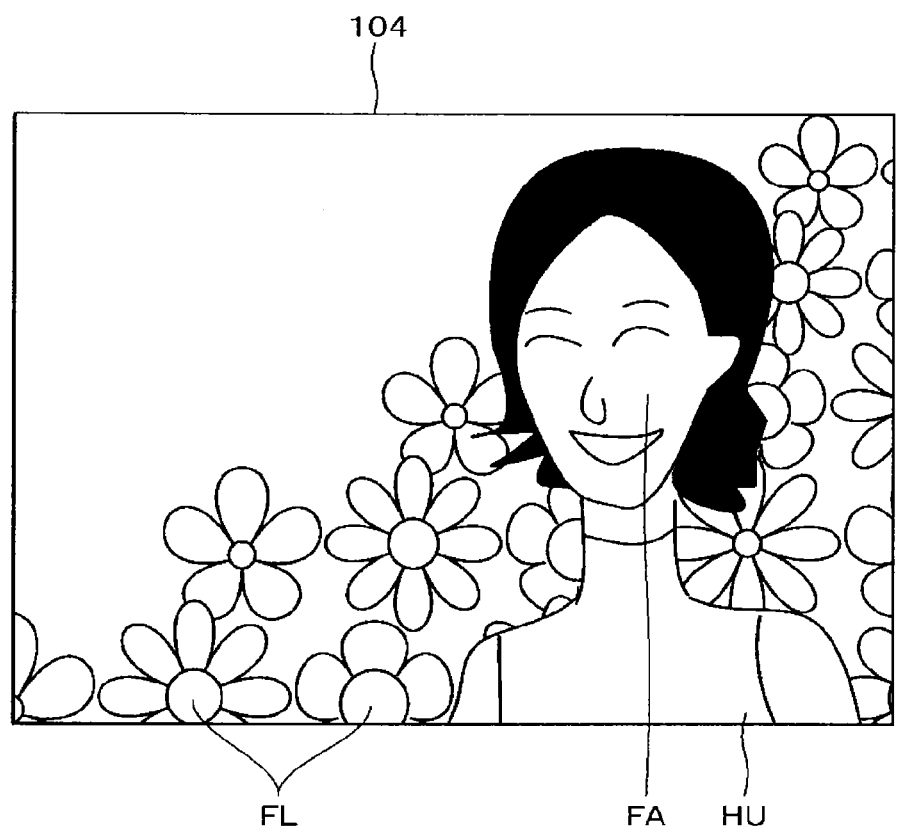
FIG. 9 is a diagram showing an example of the composition-priority digital zoom.

The zoom operation is further performed. In response, the composition-priority digital zoom is performed while the approximate center of the image-in-composition in the recommended composition FR3 is the center of enlargement. The final enlarged image is obtained and displayed. FIG. 9 shows an example of the final enlarged image. For example, the final enlarged image has the appropriate composition, which conforms to the rule of thirds.

[Example of Operation of Image Pickup Apparatus of First Embodiment]

Next, an example of the operation of the image pickup apparatus of the first embodiment will be described. According to the first embodiment, in response to a predetermined operation, an image is obtained based on the composition-priority digital zoom, and the obtained image is displayed.

Figure 10:
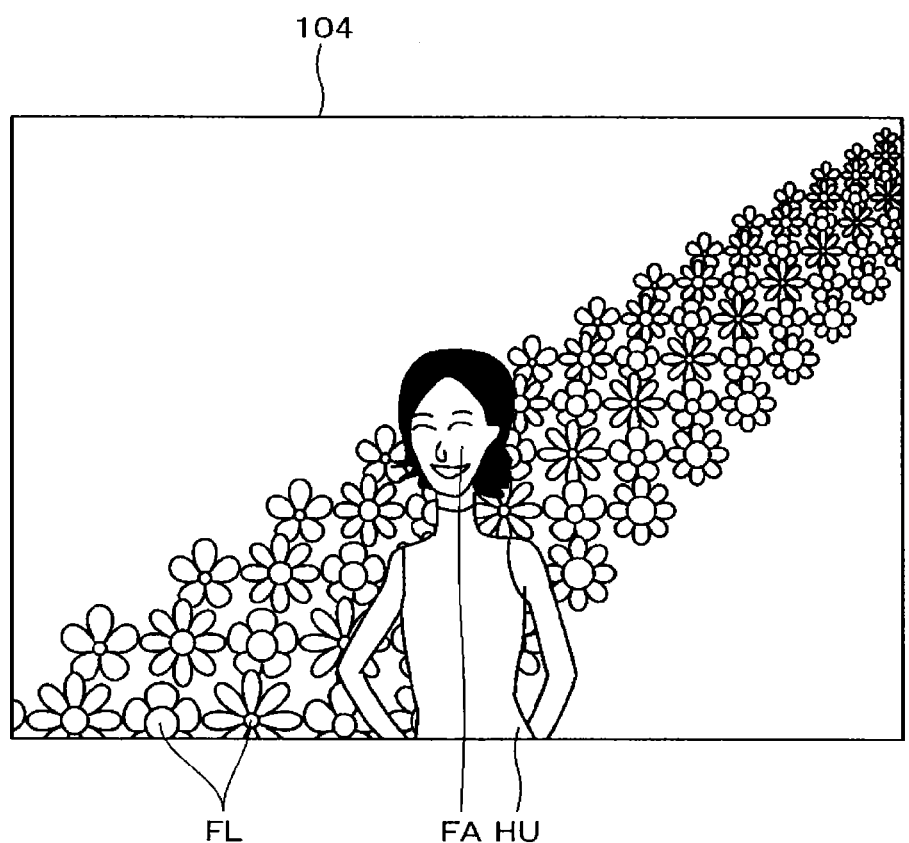
FIG. 10 is a diagram showing an example of an image displayed on the monitor of the first embodiment.

FIG. 10 shows an example of a through-the-lens image displayed on the monitor 104. The through-the-lens image of FIG. 10 is similar to the through-the-lens image of FIG. 4, and includes the person HU and the plurality of flowers FL. In general, if a user of the image pickup apparatus 1 is a beginner, as shown in FIG. 10, the object (here, the person HU) tends to be in the center of the composition. In general, a still image or a moving image having such composition gives a boring appearance. In view of this, the image pickup apparatus 1 determines the recommended composition, and displays the recommended composition on the monitor 104.

A through-the-lens image is obtained by using the lens block 200 and the like. The digital signal processor 103 supplies through-the-lens image data to the RAM 134 at predetermined timing. The through-the-lens image data of one frame corresponds to the through-the-lens image. The RAM 134 temporarily stores the through-the-lens image data. For example, the predetermined timing is ⅓₀ seconds.

The processor 131 detects a person's face from the through-the-lens image stored in the RAM 134. A person's face is an example of an important element. Any known face detection processing method may be used. For example, a method of detecting skin colors to thereby detect faces may be used. A method of detecting faces based on the contrast of faces may be used. The processor 131 superimposes a face-detection frame on the through-the-lens image stored in the RAM 134.

Figure 11:
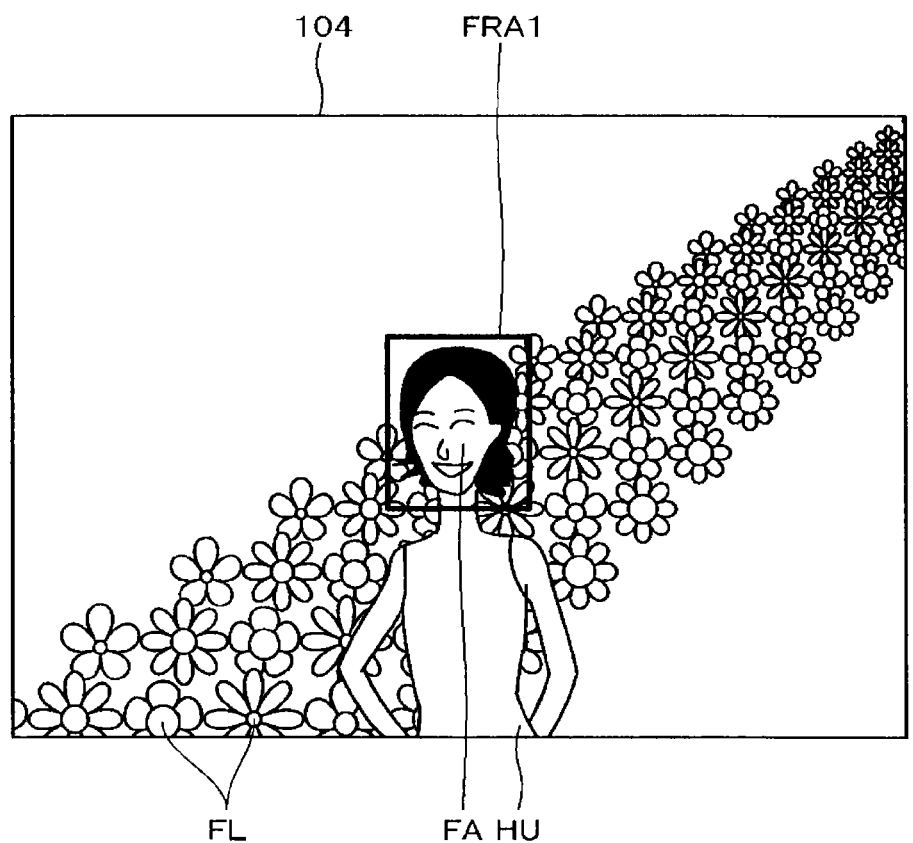
FIG. 11 is a diagram showing an example of an image displayed on the monitor of the first embodiment.

FIG. 11 shows an example of a through-the-lens image, on which a face-detection frame is superimposed. The rectangular face-detection frame FRA1 is displayed around the face FA of the person HU. Note that the shape of the face-detection frame may be changed arbitrarily.

Next, the processor 131 sets recommended composition. For example, the processor 131 sets recommended composition as follows. That is, the detected face is in the vicinity of one of the intersections of the dividing lines of the rule of thirds. Further, the processor 131 superimposes the recommended composition on the through-the-lens image. The processor 131 retrieves the through-the-lens image, on which the face-detection frame and the recommended composition are superimposed, from the RAM 134. The processor 131 supplies the retrieved through-the-lens image to the digital signal processor 103. The digital signal processor 103 supplies the through-the-lens image to the monitor 104.

Figure 12:
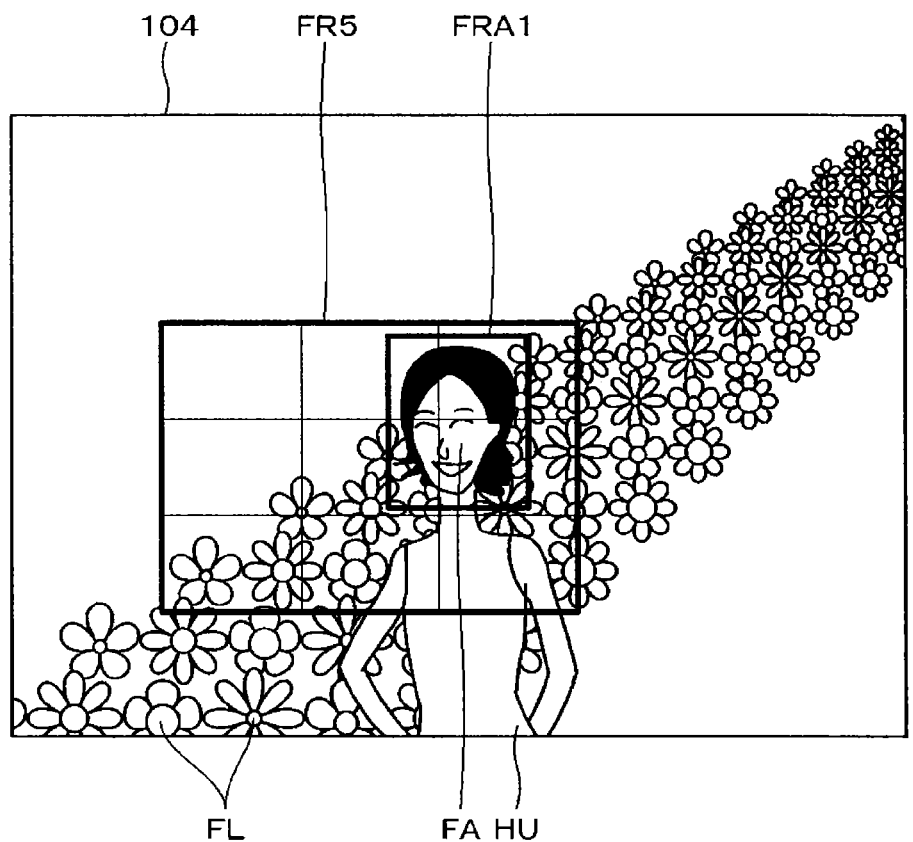
FIG. 12 is a diagram showing an example of an image displayed on the monitor of the first embodiment.

FIG. 12 shows an example of a through-the-lens image displayed on the monitor 104. As shown in FIG. 12, the face-detection frame FRA1 and the recommended composition FR5 are superimposed on the through-the-lens image. The through-the-lens image is displayed on the monitor 104. Note that the shape of the recommended composition FR5 may be changed arbitrarily. Further, the dividing lines of the rule of thirds are not necessarily displayed. Further, for example, the color of the face-detection frame FRA1 may be different from the color of the recommended composition FR5 to distinguish between them.

Meanwhile, even if recommended composition is superimposed on a through-the-lens image and is displayed, it is sometimes difficult for a user to fill the frame with the recommended composition when he operates an image pickup apparatus. For example, in order to attain the recommended composition, it is necessary to adjust the angle of view and the framing for every zoom operation. A user has to perform zoom operation and other operations again and again in order to attain the ideal composition. As a result, he may miss the best shot. In addition, he may not enjoy deciding composition and may not enjoy taking a picture. Further, for example, it may be complicated for a beginner of an image pickup apparatus to perform such an operation.

In view of the above-mentioned circumstances, according to the first embodiment, in response to a predetermined operation, an image obtained based on the composition-priority digital zoom is displayed promptly. For example, the predetermined operation is to touch a spot in the recommended composition (sometimes referred to as touch operation. It is also referred to as tap operation, etc.). As a matter of course, the predetermined operation may be another operation different from the touch operation.

That is, a user touches an arbitrary spot in the recommended composition FR5. For example, the monitor 104 generates an operation signal in response to the touch operation. The monitor 104 supplies the generated operation signal to the processor 131. The processor 131 recognizes that the recommended composition FR5 is touched.

Figure 13:
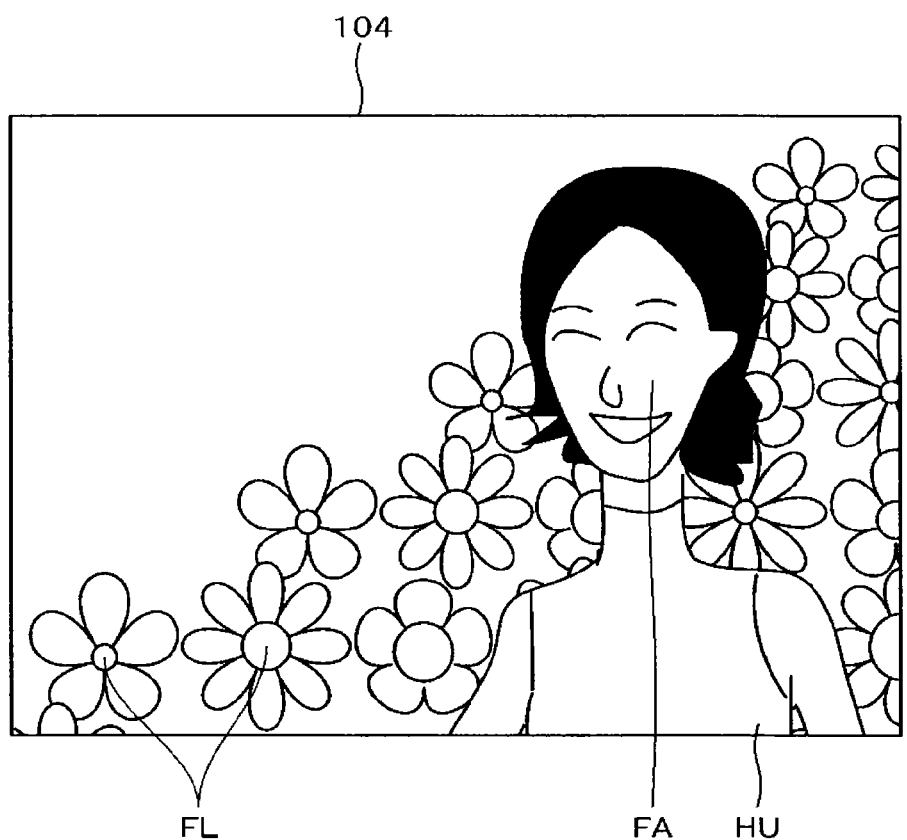
FIG. 13 is a diagram showing an example of an image displayed on the monitor of the first embodiment.

The operation signal is supplied to the processor 131. The processor 131 enlarges the image in the recommended composition FR5 based on the composition-priority digital zoom. As a result, the processor 131 generates an enlarged image. The processor 131 supplies the generated enlarged image to the monitor 104. Further, as shown in FIG. 13, the monitor 104 generates the enlarged image. The enlarged image displayed on the monitor 104 has the appropriate composition based on the rule of thirds. As described above, a user may obtain the appropriate image with the easy operation. Note that, for example, the storage device 105 may store the enlarged image displayed on the monitor 104 when a user presses the shutter button 13. Further, for example, the monitor 104 may stop displaying an enlarged image and start to display a through-the-lens image when a user presses a back button.

[Example of Processing Flow]

Figure 14:
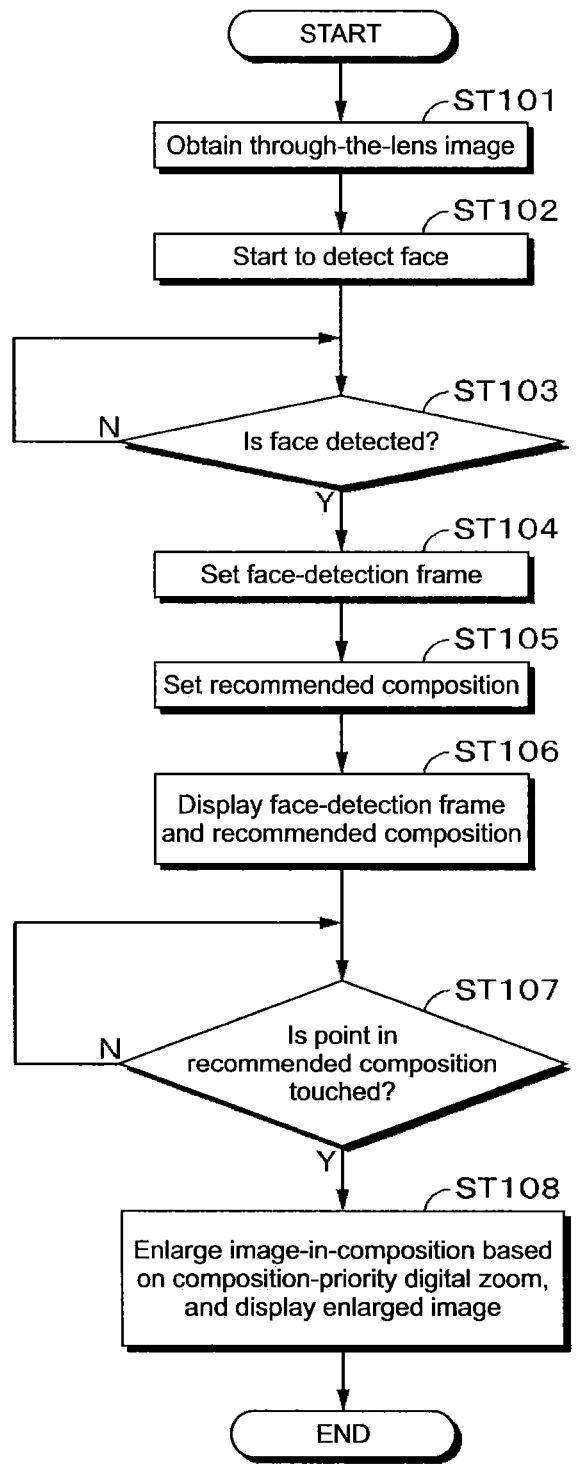
FIG. 14 is a flowchart showing an example of the processing flow of the first embodiment.

With reference to the flowchart of FIG. 14, an example of the processing flow of the first embodiment will be described. The processor 131 performs each processing except where specifically noted.

In Step ST101, an input image (through-the-lens image) is obtained by using the lens block 200 and the like. The digital signal processor 103 and the like process the through-the-lens image. The RAM 134 temporarily stores the processed through-the-lens image. Then, the processing proceeds to Step ST102.

In Step ST102, the processor 131 starts to detect a face from the through-the-lens image stored in the RAM 134. Then, the processing proceeds to Step ST103. In Step ST103, it is determined that if a face is detected or not in the face detection processing. The face is an example of an important element. If a face is detected in the face detection processing, the processing proceeds to Step ST104.

If it is determined in Step ST103 that a face is not detected in the face detection processing, the processing of Step ST103 is performed again. Note that if a face is not detected in the face detection processing, for example, the edge of the through-the-lens image may be detected, and the object in the center may be determined. Further, the object in the center may be treated as the important element, and the following processing may be performed.

In Step ST104, the processor 131 sets a face-detection frame on the detected face. Then, the processing proceeds to Step ST105.

In Step ST105, the processor 131 determines the recommended composition. In the recommended composition, the detected face is at the appropriate position. The processor 131 sets the recommended composition. Further, the processing proceeds to Step ST106.

In Step ST106, the processor 131 superimposes the face-detection frame and the recommended composition on the through-the-lens image. Further, the processor 131 supplies the through-the-lens image, on which the face-detection frame and the like are superimposed, to the monitor 104. The through-the-lens image, on which the face-detection frame and the recommended composition are superimposed, is displayed on the monitor 104 for a user. Note that the processor 131 performs the above-mentioned processing for every through-the-lens image stored in the RAM 134. Further, the processing proceeds to Step ST107.

In Step ST107, it is determined that if a point in the recommended composition is touched or not. That is, the processor 131 determines if a point in the recommended composition is touched or not based on an operation signal supplied from the monitor 104. If a point in the recommended composition is not touched, the processing returns to Step ST107. The processor 131 determines if Step ST107 is affirmative or not again. If a point in the recommended composition is touched, the processing proceeds to Step ST108.

In Step ST108, the processor 131 crops the displayed through-the-lens image based on the recommended composition to thereby generate an image-in-composition. The processor 131 enlarges the image-in-composition based on the composition-priority digital zoom to thereby generate an enlarged image. That is, the processor 131 enlarges the image-in-composition such that the enlarged image-in-composition fits in the monitor 104 to thereby generate an enlarged image. The processor 131 supplies the generated enlarged image to the monitor 104. The supplied enlarged image is displayed on the monitor 104. A user operates the image pickup apparatus 1 arbitrarily. In response, the storage device 105 may store the enlarged image displayed on the monitor 104.

As described above, according to the first embodiment, a user operates the image pickup apparatus 1 with ease, and a recommended-composition-based image is thus displayed. Further, the storage device or the like stores the displayed image as needed. As a result, a recommended-composition-based image may be obtained.

2. Second Embodiment

Next, the second embodiment will be described. The outer appearance, the configuration, and the functions of the image pickup apparatus of the second embodiment are approximately similar to those of the first embodiment. Repetition in a description thereof will be avoided arbitrarily.

[Outline of Second Embodiment]

In the second embodiment, the composition-priority digital zoom is performed in response to operations input in the zoom key. Hereinafter, the outline of the second embodiment will be described.

Figure 15:
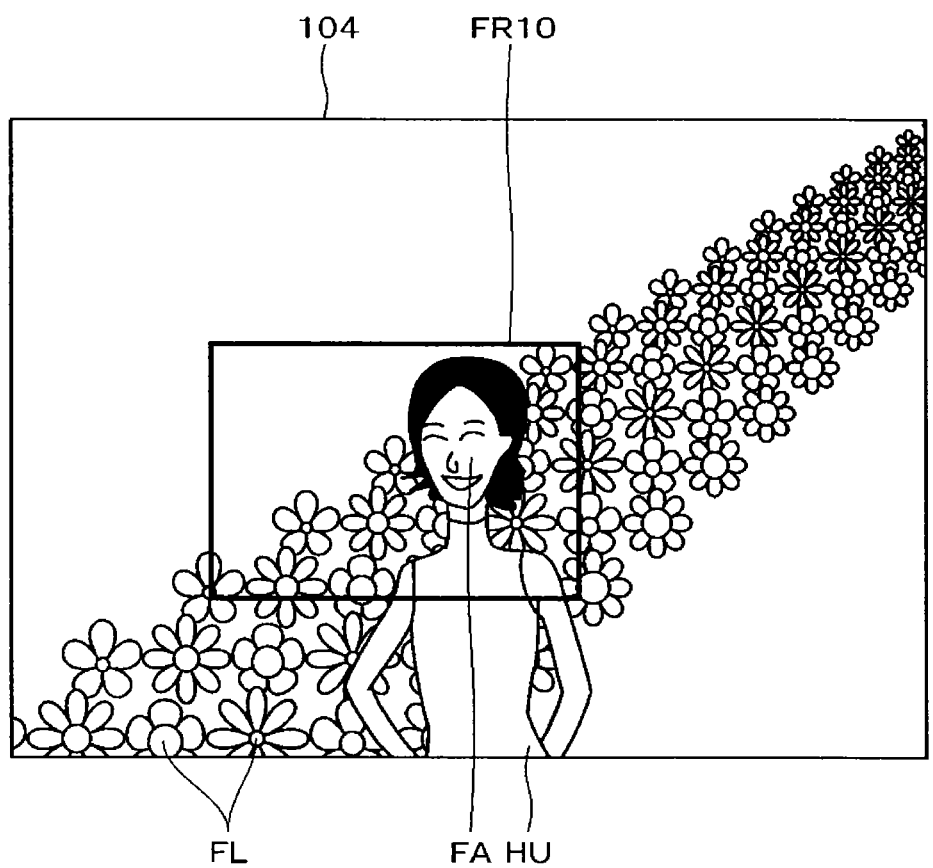
FIG. 15 is a diagram showing an example of an image displayed on the monitor of the second embodiment.

FIG. 15 shows an example of a through-the-lens image displayed on the monitor 104. The through-the-lens image of the example of FIG. 15 is similar to the through-the-lens image of the first embodiment. That is, the through-the-lens image of the example of FIG. 15 includes the person HU in the center, and the plurality of flowers FL around the person HU. Further, the recommended composition FR10 is superimposed on the through-the-lens image and displayed. Note that similar to the first embodiment, a face-detection frame may be superimposed on the through-the-lens image and displayed.

Here, let's assume that a user operates a zoom key (for example, the electric zoom key 15), and that the user instructs the image pickup apparatus 1 to enlarge the image. As described above, according to the general technology, a through-the-lens image is zoomed while the approximate center of the through-the-lens image is the center of zoom in either optical zoom or digital zoom. The enlarged image, which is zoomed in, has the following composition. That is, the object is in the center of the composition. This composition is not the appropriate composition. As a result, a user has to decide composition (framing) again and adjust the angle of view again in order to obtain an image having the appropriate composition.

In view of the above-mentioned circumstances, according to this example, for example, the composition-priority digital zoom is performed in response to an operation input in the electric zoom key 15. That is, in response to an operation input in the electric zoom key 15, an image is enlarged while the approximate center of the image-in-composition in the recommended composition is the center of enlargement. Enlarged images having different enlargement factors, respectively, are displayed in order. Seamless zoom display is performed based on the composition-priority digital zoom.

Figure 16:
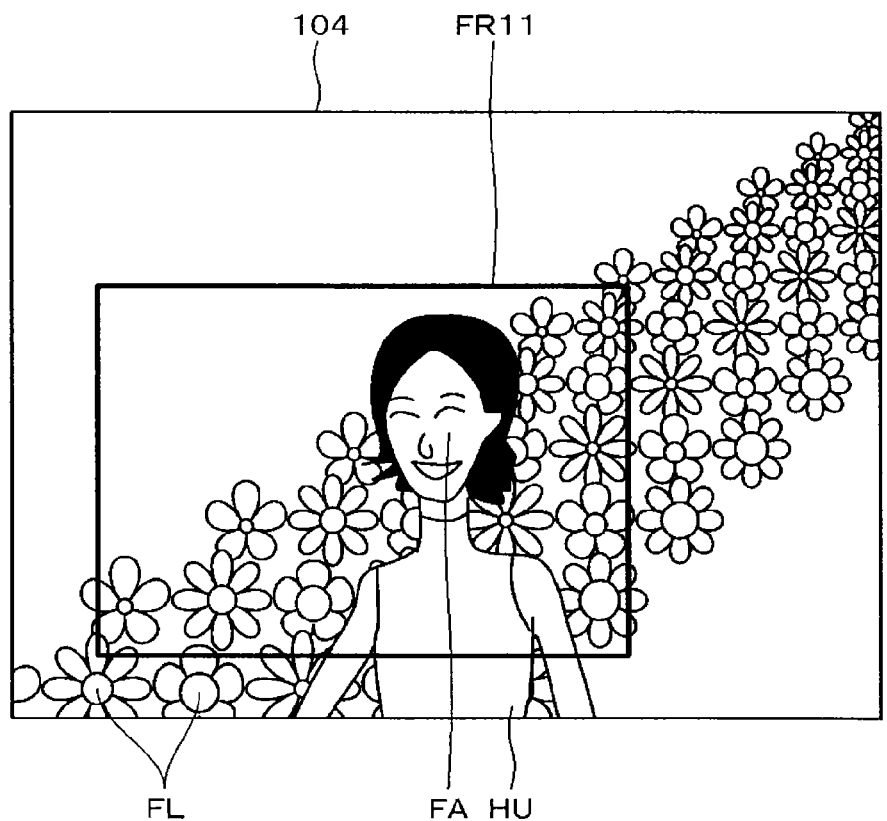
FIG. 16 is a diagram showing an example of an image displayed on the monitor of the second embodiment.
Figure 17:
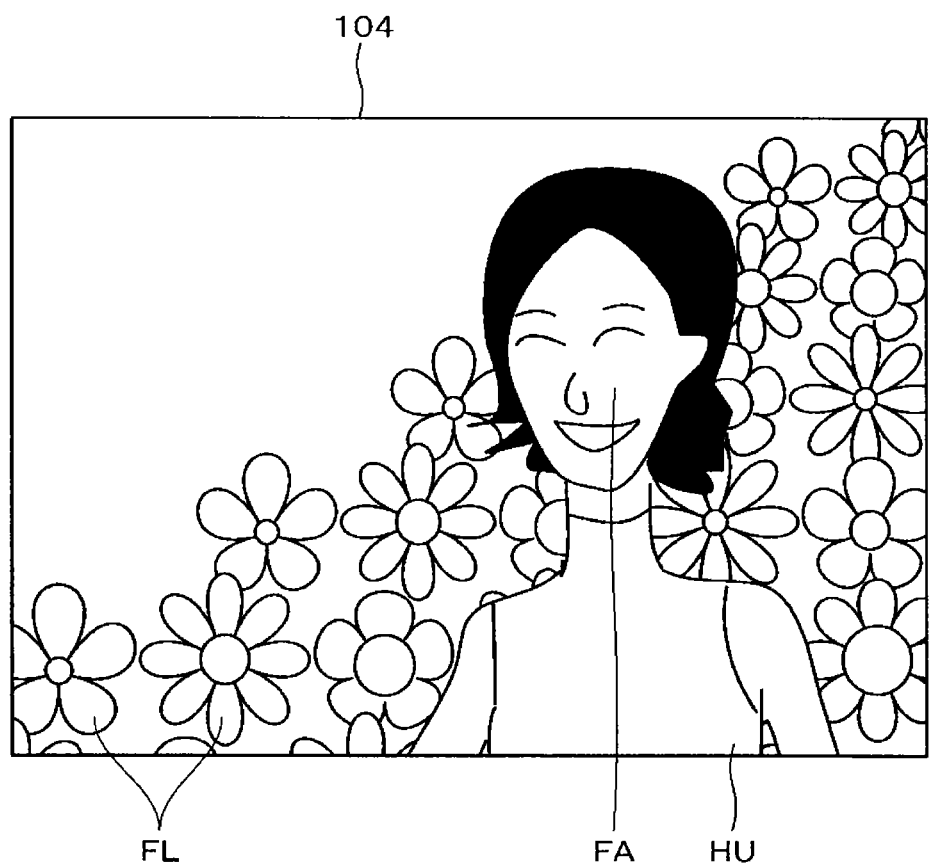
FIG. 17 is a diagram showing an example of an image displayed on the monitor of the second embodiment.

FIG. 16 shows an example of an enlarged image displayed on the monitor 104 at certain timing when the composition-priority digital zoom is performed. FIG. 17 shows an example of an enlarged image finally obtained. Note that as shown in FIG. 16, when the image is enlarged, the new recommended composition FR11 is set for an enlarged image having a certain scaling factor, and is displayed. The recommended composition is not displayed on the finally-displayed enlarged image of FIG. 17. Note that, for example, the shutter button 13 is pressed when the enlarged image of FIG. 17 is displayed. As a result, the storage device 105 may store the enlarged image.

[Example of Processing Flow]

Figure 18:
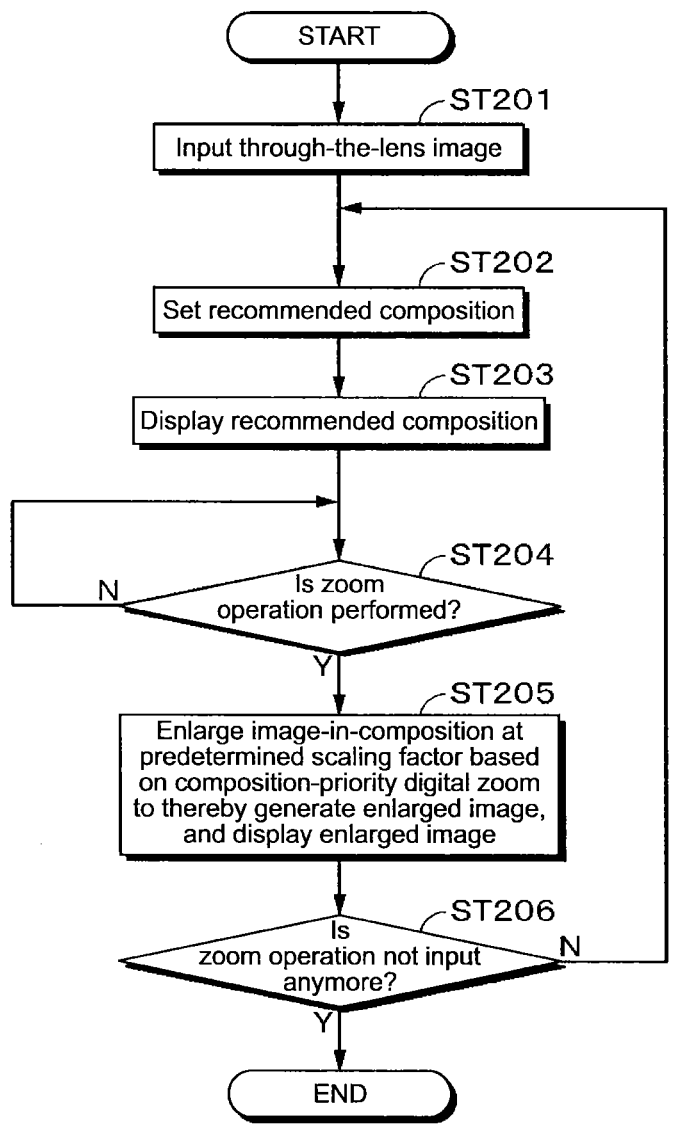
FIG. 18 is a flowchart showing an example of the processing flow of the second embodiment.

With reference to the flowchart of FIG. 18, an example of the processing flow of the second embodiment will be described. The processor 131 performs each processing except where specifically noted.

In Step ST201, an input image (through-the-lens image) is obtained by using the lens block 200 and the like. The digital signal processor 103 and the like process the through-the-lens image. The RAM 134 temporarily stores the processed through-the-lens image. Then, the processing proceeds to Step ST202.

In Step ST202, the processor 131 sets the recommended composition for the through-the-lens image stored in the RAM 134. For example, similar to the first embodiment, a face is detected from the through-the-lens image, and the recommended composition is set (not shown). The recommended composition includes the detected face at the appropriate position. Further, the processing proceeds to Step ST203.

In Step ST203, the processor 131 superimposes the recommended composition on the through-the-lens image. Further, the processor 131 supplies the through-the-lens image, on which the recommended composition is superimposed, to the monitor 104. The through-the-lens image, on which the recommended composition is superimposed, is displayed on the monitor 104 for a user. Further, the processing proceeds to Step ST204.

In Step ST204, it is determined that if the zoom operation is performed or not in response to an operation input in the electric zoom key 15. That is, the processor 131 determines if the zoom operation is performed or not based on an operation signal supplied from the electric zoom key 15 of the operating portion 106. If the zoom operation is not performed, the processing returns to Step ST204, and it is determined if Step ST204 is affirmative or not again. If the zoom operation is performed, the processing proceeds to Step ST205.

In Step ST205, the processor 131 crops the displayed recommended-composition-based image to thereby generate an image-in-composition. The processor 131 enlarges the image-in-composition at a predetermined scaling factor based on the composition-priority digital zoom to thereby generate an enlarged image. The processor 131 supplies the generated enlarged image to the monitor 104. The supplied enlarged image is displayed on the monitor 104. Note that the processor 131 stores the generated enlarged image in the RAM 134. Further, the processing proceeds to Step ST206.

In Step ST206, it is determined that if the zoom operation is not input in the electric zoom key 15 anymore or not. If the zoom operation is finished, the processing is completed. If the zoom operation is not finished and is continued, the processing returns to Step ST202. Further, the processor 131 sets new recommended composition for the enlarged image stored in the RAM 134. The processor 131 superimposes the recommended composition on the enlarged image, and displays recommended composition on the enlarged image (Step ST202, Step ST203). Next, the composition-priority digital zoom is performed on the enlarged image (YES in Step ST204, Step ST205). Then it is determined if Step ST206 is affirmative or not.

As described above, according to the second embodiment, the composition-priority digital zoom is performed in response to the operation input in the zoom key. A user operates the image pickup apparatus 1 with ease, and an image having the appropriate composition, which is enlarged based on the composition-priority digital zoom, is thus displayed.

Note that either the general digital zoom or the composition-priority digital zoom may be set and performed depending on an operation input in the zoom key. Further, both a zoom key for executing the general digital zoom and a zoom key for executing the composition-priority digital zoom may be provided. Further, in a mode in which the recommended composition is superimposed on a through-the-lens image and is displayed, the composition-priority digital zoom may be employed as the zoom function when the zoom key is operated.

[Example of Modification of Second Embodiment]

In the above-mentioned example, an enlarged image is generated based on the composition-priority digital zoom. Alternatively, both the optical zoom and the composition-priority digital zoom may be used.

Figure 19:
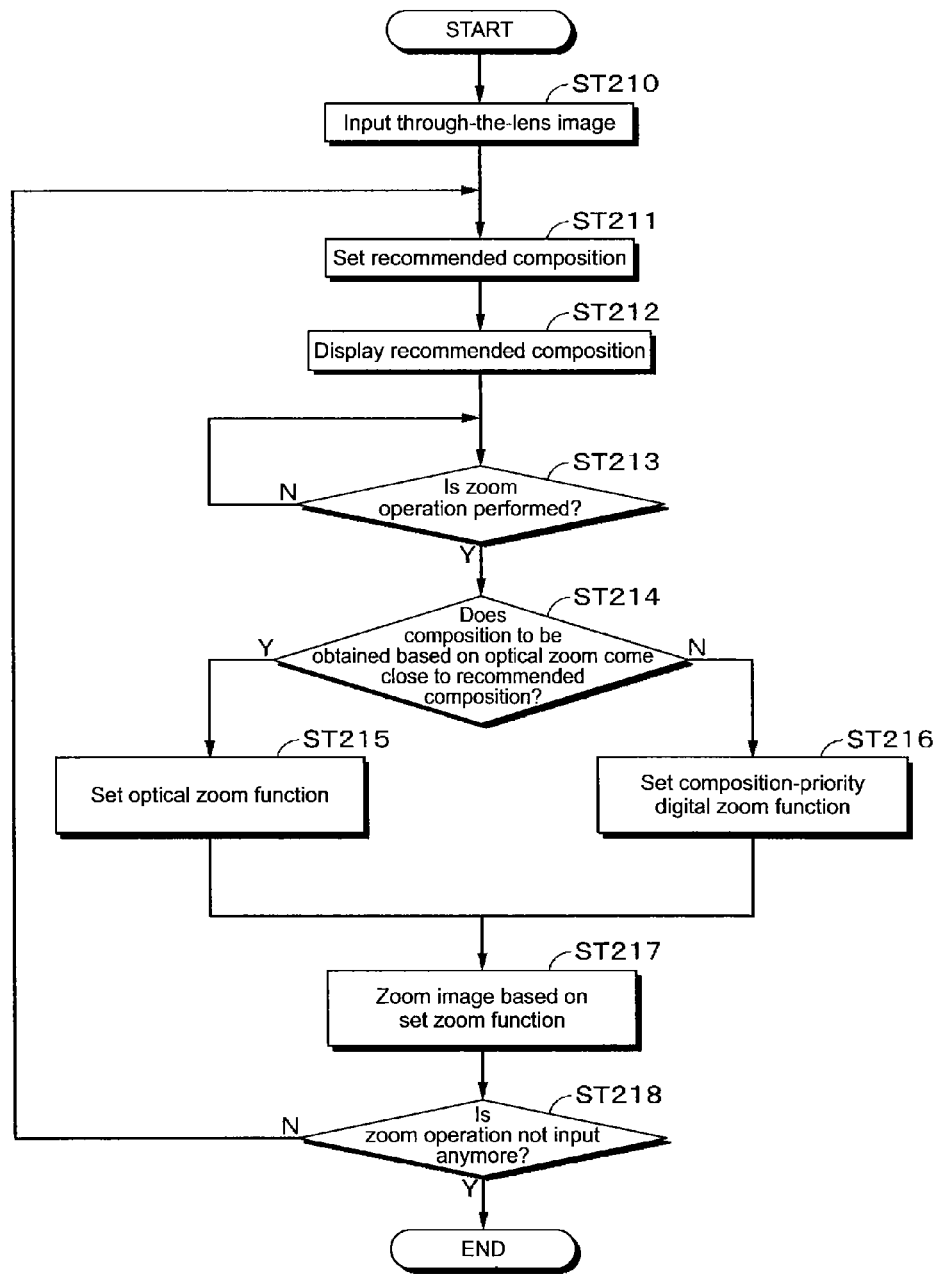
FIG. 19 is a flowchart showing an example of the processing flow of an example of modification of the second embodiment.

With reference to the flowchart of FIG. 19, an example of the processing flow of the example of the modification of the second embodiment will be described. The processor 131 performs each processing except where specifically noted.

In Step ST210, an input image (through-the-lens image) is obtained by using the lens block 200 and the like. The digital signal processor 103 and the like process the through-the-lens image. The RAM 134 temporarily stores the processed through-the-lens image. Further, the processing proceeds to Step ST211.

In Step ST211, the processor 131 sets the recommended composition for the through-the-lens image stored in the RAM 134. For example, similar to the first embodiment, a face is detected from the through-the-lens image, and the recommended composition is set (not shown). The recommended composition includes the detected face at the appropriate position. Further, the processing proceeds to Step ST212.

In Step ST212, the processor 131 superimposes the recommended composition on the through-the-lens image. Further, the processor 131 supplies the through-the-lens image, on which the recommended composition is superimposed, to the monitor 104. The through-the-lens image, on which the recommended composition is superimposed, is displayed on the monitor 104 for a user. Further, the processing proceeds to Step ST213.

In Step ST213, it is determined that if the zoom operation is performed or not in response to an operation input in the electric zoom key 15. That is, the processor 131 determines if the zoom operation is performed or not based on an operation signal supplied from the electric zoom key 15 of the operating portion 106. If the zoom operation is not performed, the processing returns to Step ST213, and it is determined if Step ST213 is affirmative or not again. If the zoom operation is performed, the processing proceeds to Step ST214.

In Step ST214, it is determined if the composition to be obtained based on the optical zoom comes close to the recommended composition or not. For example, it is determined if the image to be enlarged at the maximum zoom factor contains the image-in-composition in the recommended composition or not. If the composition to be obtained based on the optical zoom comes close to the recommended composition, the processing proceeds to Step ST215. The optical zoom function is set in Step ST215. If the composition to be obtained based on the optical zoom does not come close to the recommended composition, the processing proceeds to Step ST216. The composition-priority digital zoom function is set in Step ST216. Further, the processing proceeds to Step ST217.

In Step ST217, the image is enlarged based on the set zoom function. If the optical zoom function is set, the input image is enlarged at a predetermined scaling factor while the approximate center of the input image is the center of enlargement. As a result, an enlarged image is generated. If the composition-priority digital zoom function is set, the image-in-composition is enlarged at a predetermined scaling factor where the approximate center of the image-in-composition is the center of enlargement. As a result, an enlarged image is generated. Note that the processor 131 stores the generated enlarged image in the RAM 134. Further, the processing proceeds to Step ST218.

In Step ST218, it is determined that if the zoom operation is not input in the electric zoom key 15 anymore or not. If the zoom operation is finished, the processing is completed. If the zoom operation is not finished and is continued, the processing returns to Step ST211. Further, the processor 131 sets new recommended composition for the enlarged image stored in the RAM 134. The processor 131 superimposes the recommended composition on the enlarged image, and displays recommended composition on the enlarged image (Step ST211, Step ST212). Further, it is determined if Step ST214 is affirmative or not. The processing is performed in response to the determined result.

As described above, both the optical zoom and the composition-priority digital zoom may be used. Further, it may be determined whether the optical zoom or the composition-priority digital zoom is used as the zoom function, which is performed in response to operations input in the zoom key. Specifically, if the image quality is degraded because of the composition-priority digital zoom, the optical zoom is useful. According to the optical zoom, an image, which is enlarged as much as possible, may be obtained while the image quality is not degraded.

3. Third Embodiment

Next, the third embodiment will be described. The outer appearance, the configuration, and the functions of the image pickup apparatus of the third embodiment are approximately similar to those of the first embodiment. Repetition in a description thereof will be avoided arbitrarily.

[Outline of Third Embodiment]

When a user decides appropriate composition (framing), he operates the image pickup apparatus 1 to "adjust the center of an image" and to "adjust the angle of view" again and again alternately. As a result, composition, which is similar to the target composition, is attained. For example, if a user of the image pickup apparatus is a beginner, it may be complicated for him to perform such an operation. In view of the above-mentioned circumstances, according to the third embodiment, user interfaces (UIs) are displayed on the monitor 104. The UI assists a user to adjust the center of an image and to adjust the angle of view.

Figure 20:
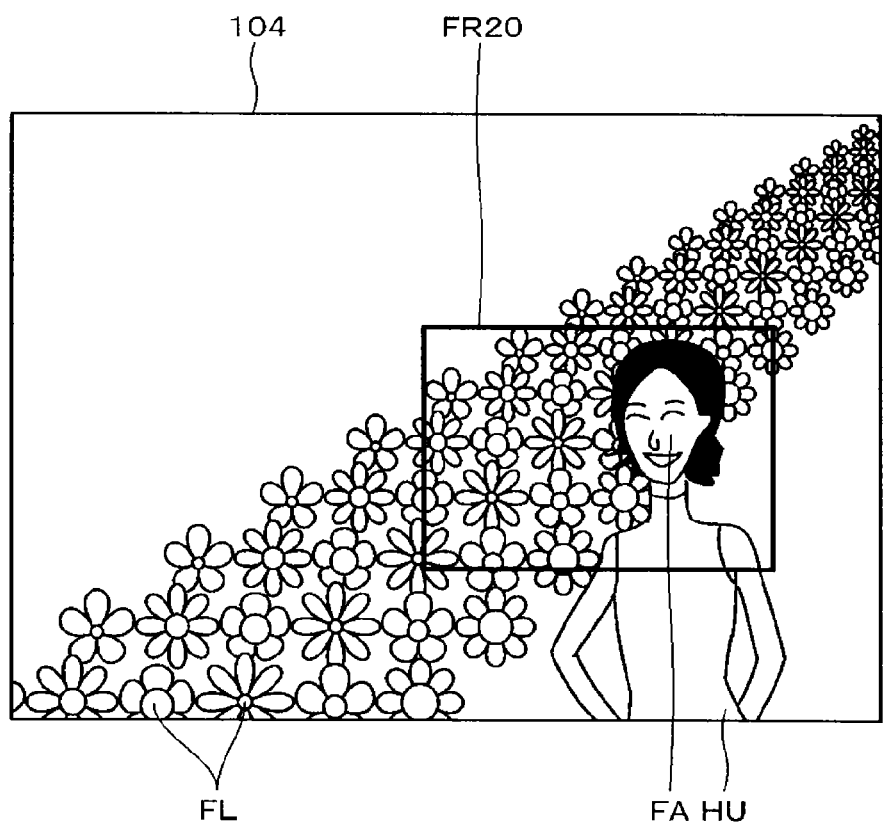
FIG. 20 is a diagram showing an example of an image displayed on the monitor of the third embodiment.

FIG. 20 shows an example of the through-the-lens image displayed on the monitor 104. The through-the-lens image of the example of FIG. 20 includes the person HU and the plurality of flowers FL. Further, the recommended composition FR20 is superimposed on the through-the-lens image, and is displayed.

Figure 21:
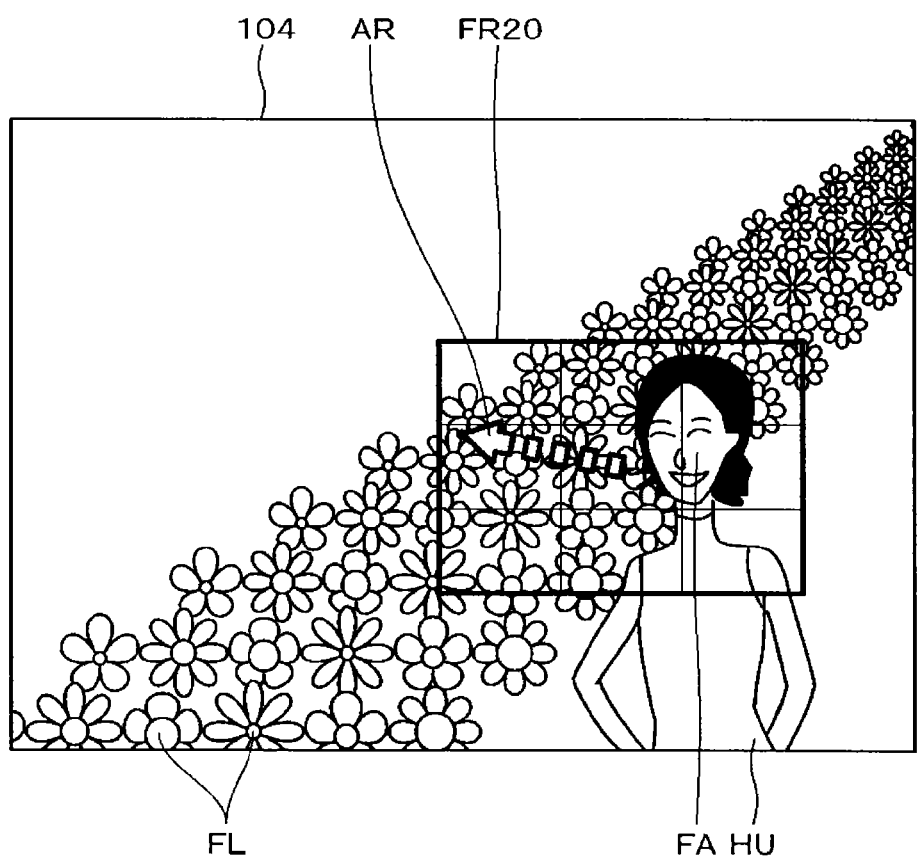
FIG. 21 is a diagram showing an example of an image displayed on the monitor of the third embodiment.

According to the third embodiment, as shown in the example of FIG. 21, the arrow AR is further displayed. The arrow AR is an example of first assist information. The first assist information assists a user to move the center of the image-in-composition to or closer to the center of the input image (sometimes referred to as "closer to"). The arrow AR extends in a direction from the center of the recommended composition to the center of the through-the-lens image (i.e., the center of the monitor 104). The user moves the center of the image-in-composition in the direction of the arrow AR.

Figure 22:
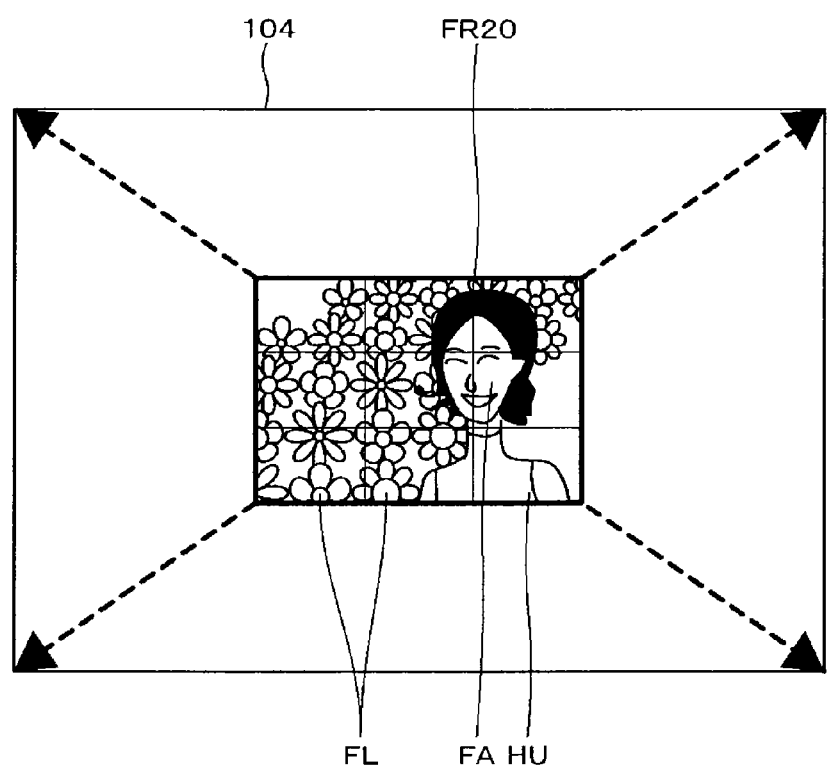
FIG. 22 is a diagram showing an example of an image displayed on the monitor of the third embodiment.

The processor 131 determines how the image pickup apparatus 1 is moved (travel direction and travel distance) based on sensor information obtained by the sensor 107. The processor 131 determines that the center of the image-in-composition is in the center of the input image based on the sensor information. In this case, for example, as shown in FIG. 22, the processor 131 displays the image-in-composition in the recommended composition FR20 such that the image-in-composition is positioned roughly in the center of the monitor 104. Note that the monitor 104 only displays the image-in-composition. As a result, a user may confirm if the recommended composition is appropriate for him or not with ease.

Figure 23:
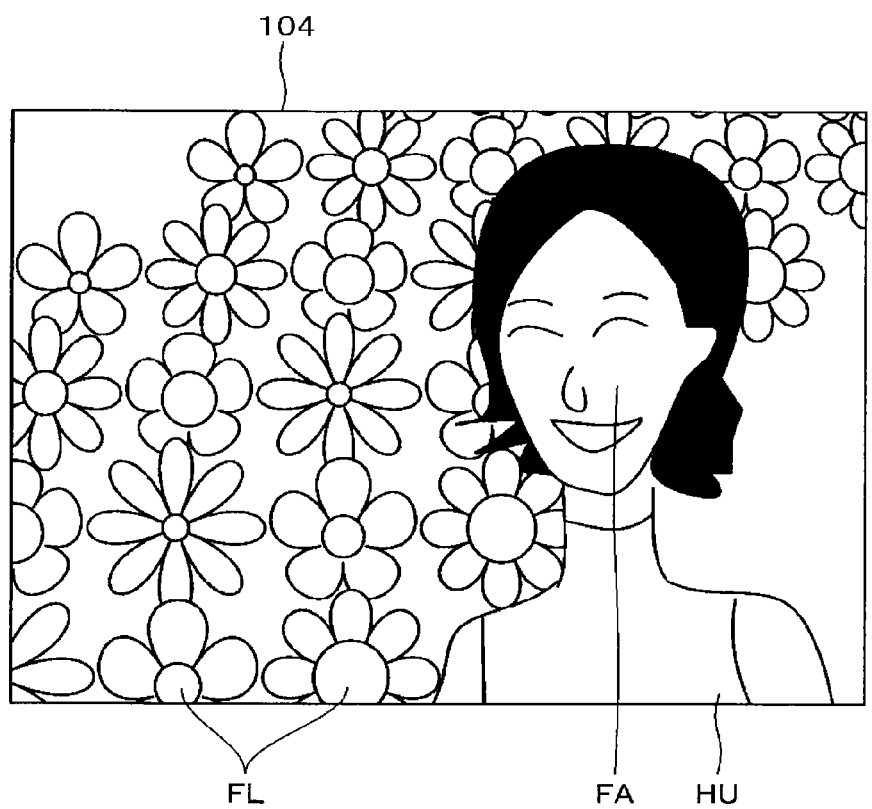
FIG. 23 is a diagram showing an example of an image displayed on the monitor of the third embodiment.

Further, the processor 131 displays second assist information on the monitor 104. The second assist information assists a user to enlarge the image-in-composition based on the composition-priority digital zoom. FIG. 22 shows arrows as an example of the second assist information. The arrows extend from the four corners of the recommended composition FR20 to the corners of the monitor 104, respectively. That is, for example, the monitor 104 only displays the recommended composition FR20 and the arrows. A user operates the electric zoom key 15, and thus inputs a zoom operation, which instructs the image pickup apparatus 1 to enlarge the image-in-composition. In response to the zoom operation, the image-in-composition is enlarged gradually while the center of the image-in-composition is the center of enlargement. The enlarged image is displayed on the monitor 104. FIG. 23 shows an example of an enlarged image finally displayed on the monitor 104.

Note that a user touches a point outside of the image-in-composition displayed on the monitor 104 of FIG. 22. In this case, the monitor 104 may display the through-the-lens image. Further, the assist information may not be arrows but may be other shapes or letters.

[Example of Processing Flow]

Figure 24:
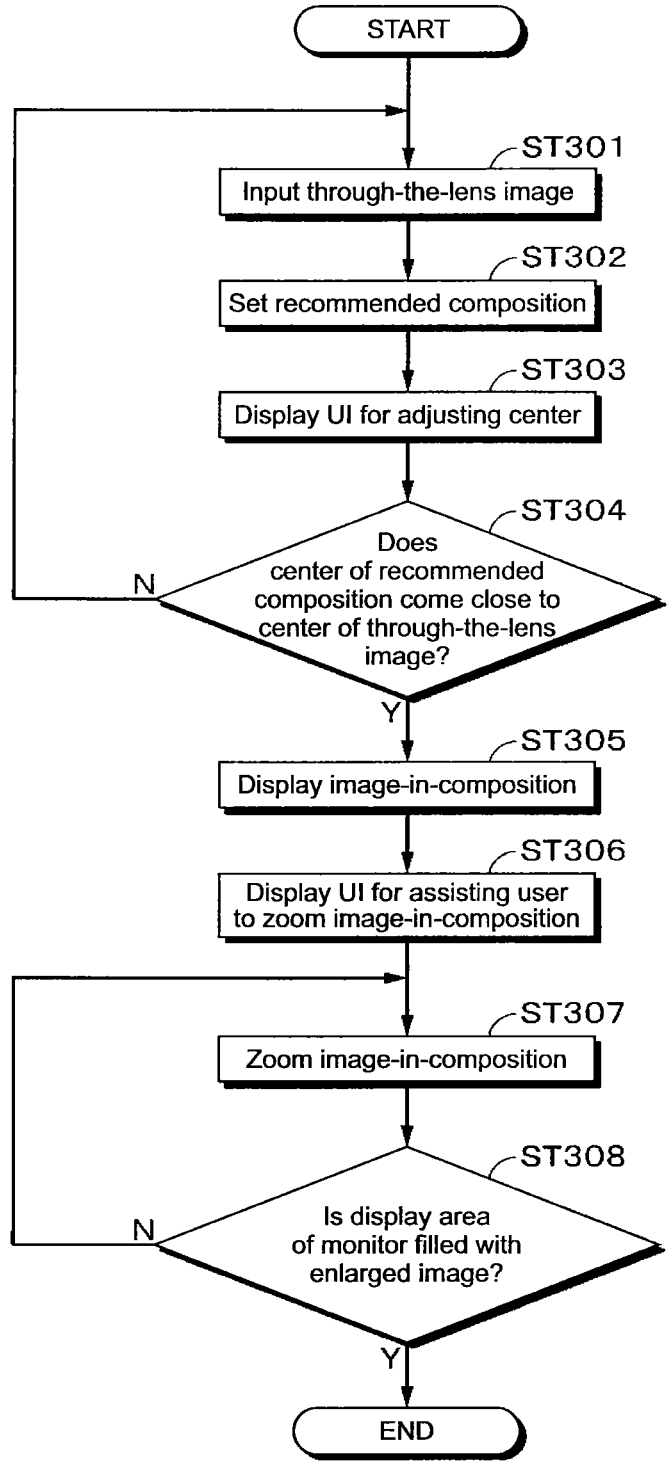
FIG. 24 is a flowchart showing an example of the processing flow of the third embodiment.

With reference to the flowchart of FIG. 24, an example of the processing flow of the third embodiment will be described. The processor 131 performs each processing except where specifically noted.

In Step ST301, an input image (through-the-lens image) is obtained by using the lens block 200 and the like. The digital signal processor 103 and the like process the through-the-lens image. The RAM 134 temporarily stores the processed through-the-lens image. Then, the processing proceeds to Step ST302.

In Step ST302, the processor 131 sets the recommended composition for the through-the-lens image stored in the RAM 134. For example, similar to the first embodiment, a face is detected from the through-the-lens image, and the recommended composition is set (not shown). The recommended composition includes the detected face at the appropriate position. Further, the processing proceeds to Step ST303.

In Step ST303, the processor 131 generates a UI for adjusting the center. For example, the UI for adjusting the center is an arrow, which extends from the center of the above-mentioned recommended composition to the center of the through-the-lens image. The recommended composition and the UI for adjusting the center, which are set by the processor 131, are superimposed on the through-the-lens image and displayed. The processing proceeds to Step ST304.

In Step ST304, the processor 131 determines if the center of the recommended composition comes close to the center of the through-the-lens image. If the center of the recommended composition does not come close to in the center of the through-the-lens image, the processing returns to Step ST301. The through-the-lens image input next is processed similarly. If the center of the recommended composition comes close to the center of the through-the-lens image, the processing proceeds to Step ST305.

In Step ST305, the processor 131 crops the through-the-lens image based on the recommended-composition to thereby generate the image-in-composition. The processor 131 outputs the generated image-in-composition to the monitor 104. The image-in-composition in the recommended composition is displayed on the monitor 104. Further, the processing proceeds to Step ST306.

In Step ST306, the processor 131 displays information for assisting a user to enlarge the image-in-composition based on the composition-priority digital zoom, on the display section. In the processing of Step ST306, the image-in-composition and the information for assisting a user to enlarge the image-in-composition are displayed on the monitor 104. Further, the processing proceeds to Step ST307.

In Step ST307, a user operates the electric zoom key 15 with reference to the information for assisting a user to enlarge the image-in-composition, to thereby input a zoom operation. The processor 131 enlarges the image-in-composition based on the zoom operation while the approximate center of the image-in-composition is the center of the enlargement, to thereby generate an image. The processor 131 generates a plurality of images having different enlargement factors, respectively. The processor 131 supplies the images to the monitor 104 in order. The monitor 104 updates the displayed images. As a result, the image-in-composition, which is enlarged gradually, is displayed on the monitor 104. Further, the processing proceeds to Step ST308.

In Step ST308, it is determined if the display area of the monitor 104 is filled with the enlarged image. If the display area of the monitor 104 is not filled with the enlarged image, the processing returns to Step ST307. If YES, that is, if the entire monitor 104 is filled with the enlarged image, the processing is completed. In this case, the processor 131 may display assist information, which shows that the entire monitor 104 is filled with the enlarged image (for example, literal information such as "end of zoom"), on the monitor 104.

Note that, in the above-mentioned processing, the processor 131 may display the information for assisting a user to enlarge an image based on the composition-priority digital zoom at first. After an enlarged image is displayed, the processor 131 may display the information for assisting a user to move the center of the image-in-composition closer to the center of the through-the-lens image.

4. Examples of Modification

The embodiments of the present technology have been described above specifically. The present technology is not limited to the above-mentioned embodiments. Various modifications may occur insofar as they are within the technical scope of the present technology.

According to the plurality of above-mentioned embodiments, a through-the-lens image, which is obtained by the image pickup section, is described as an example of an input image. However, the input image is not limited to a through-the-lens image. For example, the input image may be an image (moving image or still image) stored in a memory or an image obtained via a network such as the Internet.

The display control apparatus of the present technology is not necessarily an image pickup apparatus. Alternatively, the display control apparatus may be a personal computer, a smartphone, a tablet computer, or the like.

Further, the display control apparatus of the present technology is not necessarily a commercial-off-the-shelf image pickup apparatus. The display control apparatus may be used as a monitoring image pickup apparatus or an in-car image pickup apparatus. Further, any recommended composition may be used depending on the intended use. For example, if the display control apparatus is used as a monitoring image pickup apparatus, composition, in which a person is positioned near the center, may be set as the recommended composition. A supervisor performs the zoom operation to thereby enlarge an image having the composition, in which an intruder is positioned in the center. In this case, the zoom operation may be the operation, which remotely controls the image pickup apparatus.

The deformation based on the zoom operation is not necessarily enlargement, but may be reduction. For example, the image-in-composition in the recommended composition may be reduced based on the zoom operation and the like while the approximate center of the recommended composition is the center of reduction.

The present technology is not necessarily realized in the form of an apparatus. The present technology may be realized in the form of a method, a program, a system, and the like. For example, the program may be supplied to users via networks or via portable memories such as optical disks and semiconductor memories.

In this case, any mode may be employed as long as a program has a function of a program. Examples of a program include object codes, a program executed by an interpreter, script data supplied to an OS, and the like.

Examples of storage media for supplying the program include a flexible disk, a hard disk, a magnetic storage medium such as a magnetic tape, an optical/magnetooptical storage medium such as an MO (Magneto-Optical Disk), a CD-ROM, a CD-R (Recordable), a CD-RW (Rewritable), a DVD-ROM, DVD-R, or a DVD-RW, a nonvolatile semiconductor memory, and the like.

The following is an example of a method of supplying the program via the wired/wireless communication system. A computer program itself, which realizes the scope of the present technology, is stored in a server in a computer network. Alternatively, a data file (program data file), which may work as a computer program for realizing the scope of the present technology in a client computer, is stored in a server in a computer network. For example, the data file (program data file) is a compressed file having an automatic install function, or the like. The program data file is downloaded to the connected client computer. In this case, the program data file may be divided into a plurality of segment files. Different servers may store different segment files, respectively.

A so-called cloud system may execute the present technology. In the cloud system, a plurality of apparatuses share and process the processing described in the examples. The present technology may be realized by an apparatus, which executes at least a part of the exemplified processing, in a system. The system executes the processing exemplified in the embodiments and the examples of modification.

The configurations and the processing of the embodiments and the examples of modification may be combined arbitrarily as long as there are no technical contradictions. The order of each processing of the exemplified processing flows may be changed arbitrarily as long as there are no technical contradictions. The present technology may be realized by an image pickup apparatus, which has all the functions described in the first embodiment to the third embodiment. Alternatively, the present technology may be realized by an image pickup apparatus, which has some functions out of all the functions described in the first embodiment to the third embodiment.

The present technology may employ the following configurations.

(1) A display control apparatus, comprising:
a composition determining section configured to determine recommended composition of an input image;
an image generating section configured to generate an image based on the recommended composition; and
a display controller configured to control displaying the input image, the recommended composition, and the image based on the recommended composition, on a display section.

(2) The display control apparatus according to (1), wherein the image based on the recommended composition is a deformed image, the deformed image being obtained by deforming an image-in-composition in the recommended composition, an approximate center of the recommended composition being the center of deformation.

(3) The display control apparatus according to (2), wherein the deformed image is an enlarged image, the enlarged image being obtained by enlarging the image-in-composition, an approximate center of the recommended composition being the center of enlargement.

(4) The display control apparatus according to (3), wherein the display controller is configured to control displaying the enlarged image on the display section in response to a predetermined operation.

(5) The display control apparatus according to (4), wherein the display section is a touch panel, and the predetermined operation is to touch a point in the recommended composition displayed on the display section.

(6) The display control apparatus according to any one of (1) to (5), wherein
the display controller is configured
to control the display section to display images in order, the images being generated by the image generating section in response to an operation, the operation instructing to zoom in the image, and
to gradually enlarge the image-in-composition in the recommended composition in response to the control, the approximate center of the recommended composition being the center of enlargement.

(7) The display control apparatus according to any one of (1) to (5), wherein
the image generating section is configured
to enlarge the input image based on a first zoom method to thereby generate an image, the approximate center of the input image being the center of enlargement, and
to enlarge the image-in-composition in the recommended composition based on a second zoom method to thereby generate an image, the approximate center of the recommended composition being the center of enlargement.

(8) The display control apparatus according to (7), wherein
the image generating section is configured
to enlarge the input image based on the first zoom method in response to an operation, the operation instructing to zoom in the image, and
to enlarge the image-in-composition based on the second zoom method in a case where enlargement based on the first zoom method reaches the limit.

(9) The display control apparatus according to any one of (1) to (8), wherein
the display controller is configured to control the display section to display first assist information and second assist information in order, the first assist information assisting a user to move the center of the image-in-composition in the recommended composition closer to the center of the input image, the second assist information assisting a user to input an operation to enlarge and display the image-in-composition while the approximate center of the image-in-composition is the center of enlargement.

(10) The display control apparatus according to (9), wherein
the display controller is configured to control the display section to display the second assist information in a case where the center of the image-in-composition comes close to the center of the input image.

(11) The display control apparatus according to (10), wherein
the display controller is configured to control the display section to display only the second assist information and the image-in-composition in a case where the center of the image-in-composition comes close to the center of the input image.

(12) A display control method, comprising:
determining, by a composition determining section, recommended composition of an input image;
generating, by an image generating section, an image based on the recommended composition; and
controlling, by a display controller, displaying the input image, the recommended composition, and the image based on the recommended composition, on a display section.

(13) A program, causing a computer to execute the steps of:
determining, by a composition determining section, recommended composition of an input image;
generating, by an image generating section, an image based on the recommended composition; and
controlling, by a display controller, displaying the input image, the recommended composition, and the image based on the recommended composition, on a display section.

(14) An image pickup apparatus, comprising:
an image pickup section;
a composition determining section configured to determine recommended composition of an input image, the input image being obtained by the image pickup section;
an image generating section configured to generate an image based on the recommended composition; and
a display controller configured to control displaying the input image, the recommended composition, and the image based on the recommended composition, on a display section.

It should be understood by those skilled in the art that various modifications, combinations, sub-combinations and alterations may occur depending on design requirements and other factors insofar as they are within the scope of the appended claims or the equivalents thereof.

What is claimed is:

1. A display control apparatus, comprising:
circuitry configured to:
determine a recommended composition of an input image;
generate an image based on the recommended composition;
control displaying the input image, the recommended composition, and the image based on the recommended composition; and
display first assist information assisting a user to move an approximate center of the recommended composition closer to an approximate center of the input image by pointing a direction with an arrow originating from the approximate center of the recommended composition and terminating at the approximate center of the input image, wherein the circuitry is further configured to display second assist information after the first assist information, the second assist information assisting the user to input an operation to enlarge and display an image-in-composition while an approximate center of the image-in-composition is the center of an enlarged image of the image.

2. The display control apparatus according to claim 1, wherein the image based on the recommended composition is a deformed image, the deformed image being obtained by deforming the image-in-composition in the recommended composition, the approximate center of the recommended composition being the center of deformation.

3. The display control apparatus according to claim 2, wherein the deformed image is the enlarged image, the enlarged image being obtained by enlarging the image-in-composition, the approximate center of the recommended composition being the center of enlargement.

4. The display control apparatus according to claim 3, wherein the circuitry is further configured to control displaying the enlarged image on a touch panel in response to a predetermined operation.

5. The display control apparatus according to claim 4, wherein the predetermined operation is to touch a point in the recommended composition displayed on the touch panel.

6. The display control apparatus according to claim 1, wherein the circuitry is further configured to:
display images in order, the images being generated in response to an operation, the operation instructing to zoom in the image, and
gradually enlarge the image-in-composition in the recommended composition in response to the control, the approximate center of the recommended composition being the center of enlargement.

7. The display control apparatus according to claim 1, wherein the circuitry is further configured to:
enlarge the input image based on a first zoom method to thereby generate an image, the approximate center of the input image being the center of enlargement, and
enlarge the image-in-composition in the recommended composition based on a second zoom method to thereby generate an image, the approximate center of the recommended composition being the center of enlargement.

8. The display control apparatus according to claim 7, wherein the circuitry is further configured to:
enlarge the input image based on the first zoom method in response to an operation, the operation instructing to zoom in the image, and
enlarge the image-in-composition based on the second zoom method in a case where enlargement based on the first zoom method reaches a limit.

9. The display control apparatus according to claim 1, wherein the circuitry is further configured to display the second assist information in a case where the approximate center of the image-in-composition comes close to the approximate center of the input image.

10. The display control apparatus according to claim 9, wherein the circuitry is further configured to display only the second assist information and the image-in-composition in a case where the approximate center of the image-in-composition comes close to the approximate center of the input image.

11. A display control method, comprising:
determining, by circuitry, recommended composition of an input image;
generating, by the circuitry, an image based on the recommended composition;
controlling, by the circuitry, displaying the input image, the recommended composition, and the image based on the recommended composition;
displaying, by the circuitry, first assist information assisting a user to move an approximate center of the recommended composition closer to an approximate center of the input image by pointing a direction with an arrow originating from the approximate center of the recommended composition and terminating at the approximate center of the input image; and displaying, by the circuitry, second assist information after the first assist information, the second assist information assisting the user to input an operation to enlarge and display an image-in-composition while an approximate center of the image-in-composition is the center of an enlarged image of the image.

12. A non-transitory computer readable medium storing a computer readable program thereon, when executed by a computer, causes the computer to perform a method comprising:
  determining, by circuitry, a recommended composition of an input image;
  generating, by the circuitry, an image based on the recommended composition;
  controlling, by the circuitry, displaying the input image, the recommended composition, and the image based on the recommended composition;
  displaying, by the circuitry, first assist information assisting a user to move an approximate center of the recommended composition closer to an approximate center of the input image by pointing a direction with an arrow originating from the approximate center of the recommended composition and terminating at the approximate center of the input image; and
  displaying, by the circuitry, second assist information after the first assist information, the second assist information assisting the user to input an operation to enlarge and display an image-in-composition while an approximate center of the image-in-composition is the center of an enlarged image of the image.

13. An image pickup apparatus, comprising:
  circuitry configured to:
  determine a recommended composition of an input image, the input image being obtained by the image pickup apparatus;
  generate an image based on the recommended composition;
  control displaying the input image, the recommended composition, and the image based on the recommended composition;
  display first assist information assisting a user to move an approximate center of the recommended composition closer to an approximate center of the input image by pointing a direction with an arrow originating from the approximate center of the recommended composition and terminating at the approximate center of the input image; and
  display second assist information after the first assist information, the second assist information assisting the user to input an operation to enlarge and display an image-in-composition while an approximate center of the image-in-composition is the center of an enlarged image of the image.

14. The image pickup apparatus according to claim 13, wherein the image based on the recommended composition is a deformed image, the deformed image being obtained by deforming the image-in-composition in the recommended composition, the approximate center of the recommended composition being the center of deformation.

15. The image pickup apparatus according to claim 14, wherein the deformed image is the enlarged image, the enlarged image being obtained by enlarging the image-in-composition, the approximate center of the recommended composition being the center of enlargement.

16. The image pickup apparatus according to claim 15, wherein the circuitry is further configured to control displaying the enlarged image on a touch panel in response to a predetermined operation.

17. The image pickup apparatus according to claim 16, wherein the predetermined operation is to touch a point in the recommended composition displayed on the touch panel.

18. The image pickup apparatus according to claim 13, wherein the circuitry is further configured to:
  display images in order, the images being generated in response to an operation, the operation instructing to zoom in the image, and
  gradually enlarge the image-in-composition in the recommended composition in response to the control, the approximate center of the recommended composition being the center of enlargement.

19. The image pickup apparatus according to claim 13, wherein the circuitry is further configured to:
  enlarge the input image based on a first zoom method to thereby generate an image, the approximate center of the input image being the center of enlargement, and
  enlarge the image-in-composition in the recommended composition based on a second zoom method to thereby generate an image, the approximate center of the recommended composition being the center of enlargement.

20. The image pickup apparatus according to claim 19, wherein the circuitry is further configured to:
  enlarge the input image based on the first zoom method in response to an operation, the operation instructing to zoom in the image, and
  enlarge the image-in-composition based on the second zoom method in a case where enlargement based on the first zoom method reaches a limit.

* * * * *